United States Patent
Araki

(10) Patent No.: US 9,286,141 B2
(45) Date of Patent: Mar. 15, 2016

(54) IMAGE FORMING APPARATUS, PROGRAM MANAGEMENT SYSTEM, PROGRAM MANAGEMENT METHOD, AND COMPUTER-READABLE STORAGE MEDIUM

(75) Inventor: Ryoji Araki, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 531 days.

(21) Appl. No.: 12/848,252

(22) Filed: Aug. 2, 2010

(65) Prior Publication Data

US 2011/0041144 A1 Feb. 17, 2011

(30) Foreign Application Priority Data

Aug. 11, 2009 (JP) .................. 2009-186746

(51) Int. Cl.
*G06F 9/44* (2006.01)
*G06F 3/00* (2006.01)
*G06F 9/54* (2006.01)

(52) U.S. Cl.
CPC ...................... *G06F 9/541* (2013.01)

(58) Field of Classification Search
None
See application file for complete search history.

(56) References Cited

U.S. PATENT DOCUMENTS

| | | | |
|---|---|---|---|
| 6,026,238 A | 2/2000 | Bond et al. | |
| 6,693,722 B1* | 2/2004 | Mixer, Jr. | 358/1.15 |
| 6,940,615 B1* | 9/2005 | Shima | 358/1.15 |
| 7,543,019 B1 | 6/2009 | Cormier | |
| 2001/0052901 A1* | 12/2001 | Kawabata et al. | 345/467 |
| 2004/0024878 A1 | 2/2004 | Makimoto et al. | |
| 2005/0007615 A1* | 1/2005 | Sato | 358/1.13 |
| 2005/0071422 A1* | 3/2005 | Booth et al. | 709/203 |
| 2005/0275851 A1* | 12/2005 | Kim | 358/1.1 |
| 2006/0031855 A1 | 2/2006 | Smithline | |
| 2006/0215201 A1 | 9/2006 | Shimizu et al. | |
| 2007/0008583 A1 | 1/2007 | Araki | |
| 2007/0081197 A1* | 4/2007 | Omoigui | 358/403 |
| 2007/0083629 A1* | 4/2007 | Sugishita | 709/223 |
| 2008/0034362 A1 | 2/2008 | Hayama et al. | |
| 2008/0209569 A1 | 8/2008 | Araki | |

(Continued)

FOREIGN PATENT DOCUMENTS

EP 1 001 337 A2 5/2000
EP 1 117 033 A1 7/2001

(Continued)

OTHER PUBLICATIONS

The extended European search report dated Dec. 8, 2011.

(Continued)

*Primary Examiner* — Umut Onat
(74) *Attorney, Agent, or Firm* — IPUSA, PLLC

(57) ABSTRACT

An image forming apparatus may be coupled to another image forming apparatus that manages first programs using a first program execution environment providing part in response to a request in accordance with first interface specifications using a predetermined communication protocol. The image forming apparatus manages second programs using a second program execution environment providing part that has a structure different from that of the first program execution environment providing part in response to an a request in accordance with second interface specifications, accepts the request in accordance with the first interface specifications, and converts the accepted request into a request in accordance with the second interface specifications to be input to the program management part.

15 Claims, 18 Drawing Sheets

(56) References Cited

U.S. PATENT DOCUMENTS

| | | |
|---|---|---|
| 2009/0019159 A1 | 1/2009 | Ma et al. |
| 2010/0169308 A1* | 7/2010 | Das et al. .................. 707/736 |

FOREIGN PATENT DOCUMENTS

| | | |
|---|---|---|
| EP | 1 122 644 A1 | 8/2001 |
| JP | 2004-062555 A | 2/2004 |
| JP | 2004-094754 | 3/2004 |
| JP | 2005-100437 A | 4/2005 |
| JP | 2006-164191 A | 6/2006 |
| JP | 2007-048270 | 2/2007 |
| JP | 2007-049677 | 2/2007 |
| JP | 2009-177746 A | 8/2009 |

OTHER PUBLICATIONS

Japanese Office Action dated Jul. 9, 2013.
Japanese Office Action dated Feb. 3, 2015.

* cited by examiner

FIG.8

```
<application>
    <productid>11010001</productid>
    <name>HelloXlet</name>
    <description>Sample Xlet</description>
    <state>notinstalled</state>
    <version>1.0</version>
    <original>sd1</original>
    <vendor>RRR</vendor>
    <e-mail>xxx@xxx.xxx</e-mail>
    <tel>00-0000-0000</tel>
    <fax>00-0000-0000</fax>
    <autorun>false</autorun>
</application>
```

FIG.10

```
<application>
    <productid>11010001</productid>
    <name>HelloXlet</name>
    <description>Sample Xlet</description>
    <state>stop</state>
    <version>1.0</version>
    <distination>sd1</distination>
    <vendor>RRR</vendor>
    <e-mail>xxx@xxx.xxx</e-mail>
    <tel>00-0000-0000</tel>
    <fax>00-0000-0000</fax>
    <autorun>false</autorun>
</application>
```

IMAGE FORMING APPARATUS, PROGRAM MANAGEMENT SYSTEM, PROGRAM MANAGEMENT METHOD, AND COMPUTER-READABLE STORAGE MEDIUM

CROSS-REFERENCE TO RELATED APPLICATIONS

This application claims the benefit of a Japanese Patent Application No. 2009-186746 filed on Aug. 11, 2009, in the Japanese Patent Office, the disclosure of which is hereby incorporated by reference.

BACKGROUND OF THE INVENTION

1. Field of the Invention

The present invention relates to image forming apparatuses, program management systems, program management methods, and computer-readable storage media that store program management programs.

2. Description of the Related Art

Recently, image forming apparatuses that are often referred to as MFPs (Multi-Function Peripherals) or composite apparatuses are implemented with an application platform (or application execution environment) having a public or open API (Application Program Interface). Hence, an application that is developed by a third party vendor other than a manufacturer of the image forming apparatus may also be utilized in the image forming apparatus.

The image forming apparatus of the type described above includes a management mechanism for managing the applications. For example, a Japanese Laid-Open Patent Publication No. 2007-49677 proposes a management mechanism for managing, in an integrated manner, applications on a plurality of application platforms implemented within a single image forming apparatus.

In the image forming apparatus of the type described above, the software architecture of the application platform may be drastically modified and a new structure for the application platform may be developed depending on a change in the hardware structure or depending on needs of the market. In this case, the management mechanism for managing the applications in the new application platform may become completely different from that of the existing application platform.

When a new image forming apparatus implemented with a new application platform is put on the market, it is rare for all of the existing image forming apparatuses set up within an office to be replaced by the new image forming apparatus from a certain point in time. Normally, the existing image forming apparatuses and the new image forming apparatuses will coexist within the office.

However, if the application management mechanism of the existing image forming apparatus and the application management mechanism of the new image forming apparatus are different, the user must be able to use both the application management mechanisms. The need for the user to be able to use both the application management mechanisms places a burden on the user, which in turn may encourage the user not to replace the existing image forming apparatus by the new image forming apparatus.

SUMMARY OF THE INVENTION

Accordingly, it is a general object of one embodiment of the present invention to provide a novel and useful image forming apparatus, program management system, program management method, and computer-readable storage medium, in which the problem described above may be suppressed.

Another and more specific object of one embodiment of the present invention is to provide an image forming apparatus, a program management system, a program management method, and a computer-readable storage medium, that may manage programs of a plurality of image forming apparatuses in an integrated manner.

According to one aspect of the present invention, there is provided an image forming apparatus to be coupled via a network to another image forming apparatus that includes a first program execution environment providing part and manages first programs using the first program execution environment providing part in response to an input of a request in accordance with first interface specifications using a predetermined communication protocol, comprising a program management part configured to manage second programs using a second program execution environment providing part that has a structure different from that of the first program execution environment providing part, in response to an input of a request in accordance with second interface specifications; a compatible interface providing part configured to accept an input of the request in accordance with the first interface specifications; and an intermediating part configured to convert the request accepted by the compatible interface providing part into a request in accordance with the second interface specifications, and to input the converted request to the program management part.

According to one aspect of the present invention, there is provided a program management system comprising a first image forming apparatus, including a first program execution environment providing part, and configured to manage first programs using the first program execution environment providing part in response to an input of a request in accordance with first interface specifications using a predetermined communication protocol; and a second image forming apparatus coupled to the first image forming apparatus via a network, and comprising a program management part configured to manage second programs using a second program execution environment providing part that has a structure different from that of the first program execution environment providing part, in response to an input of a request in accordance with second interface specifications; a compatible interface providing part configured to accept an input of the request in accordance with the first interface specifications; and an intermediating part configured to convert the request accepted by the compatible interface providing part into a request in accordance with the second interface specifications, and to input the converted request to the program management part.

According to one aspect of the present invention, there is provided a computer-readable storage medium which stores a program which, when executed by a computer, causes the computer to carry out a process of an image forming apparatus coupled via a network to another image forming apparatus that includes a first program execution environment providing part and manages first programs using the first program execution environment providing part in response to an input of a request in accordance with first interface specifications using a predetermined communication protocol, the process comprising a program management procedure to cause the computer to manage second programs using a second program execution environment providing part that has a structure different from that of the first program execution environment providing part, in response to an input of a request in accordance with second interface specifications; a compatible interface providing procedure to cause the computer to accept an input of the request in accordance with the first interface specifications; and an intermediating procedure to cause the computer to convert the request accepted by the compatible interface providing procedure into a request in accordance with the second interface specifications, and to input the converted request to the program management procedure.

Other objects and further features of the present invention will be apparent from the following detailed description when read in conjunction with the accompanying drawings.

BRIEF DESCRIPTION OF THE DRAWINGS

FIG. 8 is a diagram illustrating an example of application information related to a single SDK (Software Development Kit) application;

FIG. 10 is a diagram illustrating an example of the application information updated by the installing;

DESCRIPTION OF THE PREFERRED EMBODIMENTS

Figure 1:
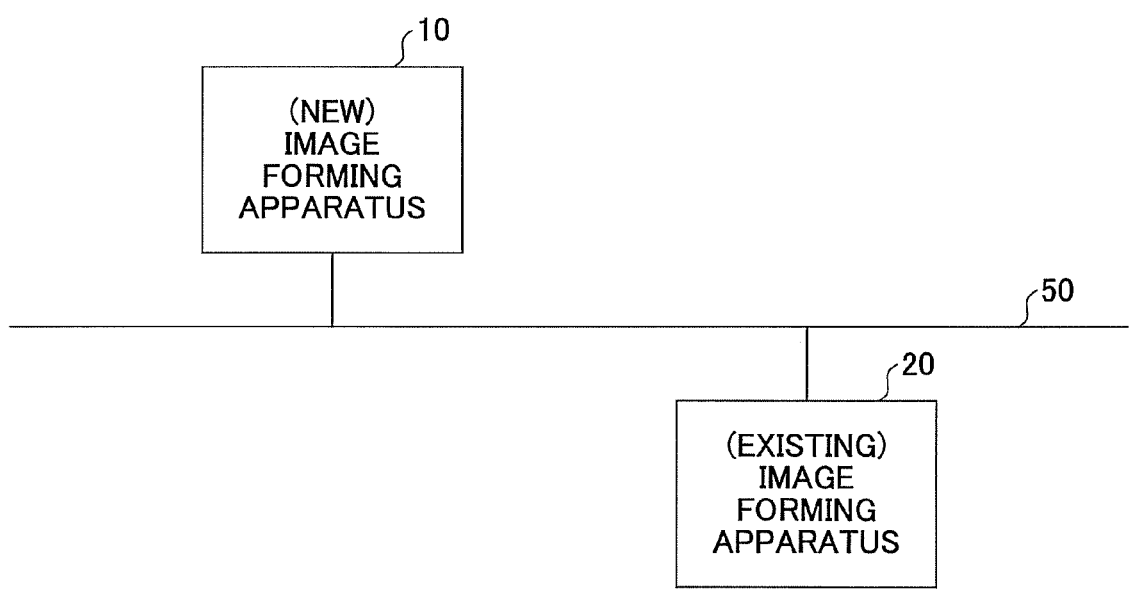
FIG. 1 is a block diagram illustrating an example of a system structure in one embodiment of the present invention.

A description will be given of embodiments of an image forming apparatus, a program management system, a program management method, and a computer-readable storage medium according to the present invention, by referring to the drawings.

FIG. 1 is a block diagram illustrating an example of a system structure in one embodiment of the present invention. In FIG. 1, an image forming apparatus 10 and an image forming apparatus 20 are connected via a network 50, such as a LAN (Local Area Network), within a single office, for example. The network 50 may be a cable network, a wireless network or, a combination of cable and wireless networks.

Each of the image forming apparatuses 10 and 20 has an application platform (or application execution environment, forming a program executing environment providing unit or means) having a public, or open API (Application Program Interface). However, the software architecture of the application platform of the image forming apparatus 10 and the software architecture of the application platform of the image forming apparatus 20 differ. In addition, the API of the application platform of the image forming apparatus 10 and the API of the application platform of the image forming apparatus 20 differ.

A program which, when executed by a computer, such as a CPU of the image forming apparatus, causes the computer to carry out the functions of the image forming apparatus described hereunder, may be stored in a suitable computer-readable storage medium. For example, the computer-readable storage medium may be formed by a magnetic recording medium, an optical recording medium, a magneto-optical recording medium, and a semiconductor memory device.

In one embodiment of the present invention, it is assumed for the sake of convenience that the application platform of the image forming apparatus 10 is newer than the application platform of the image forming apparatus 20. Hence, the image forming apparatus 10 will hereinafter also be referred to as the new image forming apparatus 10, and the image forming apparatus 20 will hereinafter also be referred to as the existing image forming apparatus 20. The existing image forming apparatus 20 may be regarded as being old compared to the new image forming apparatus 10.

Figure 2:
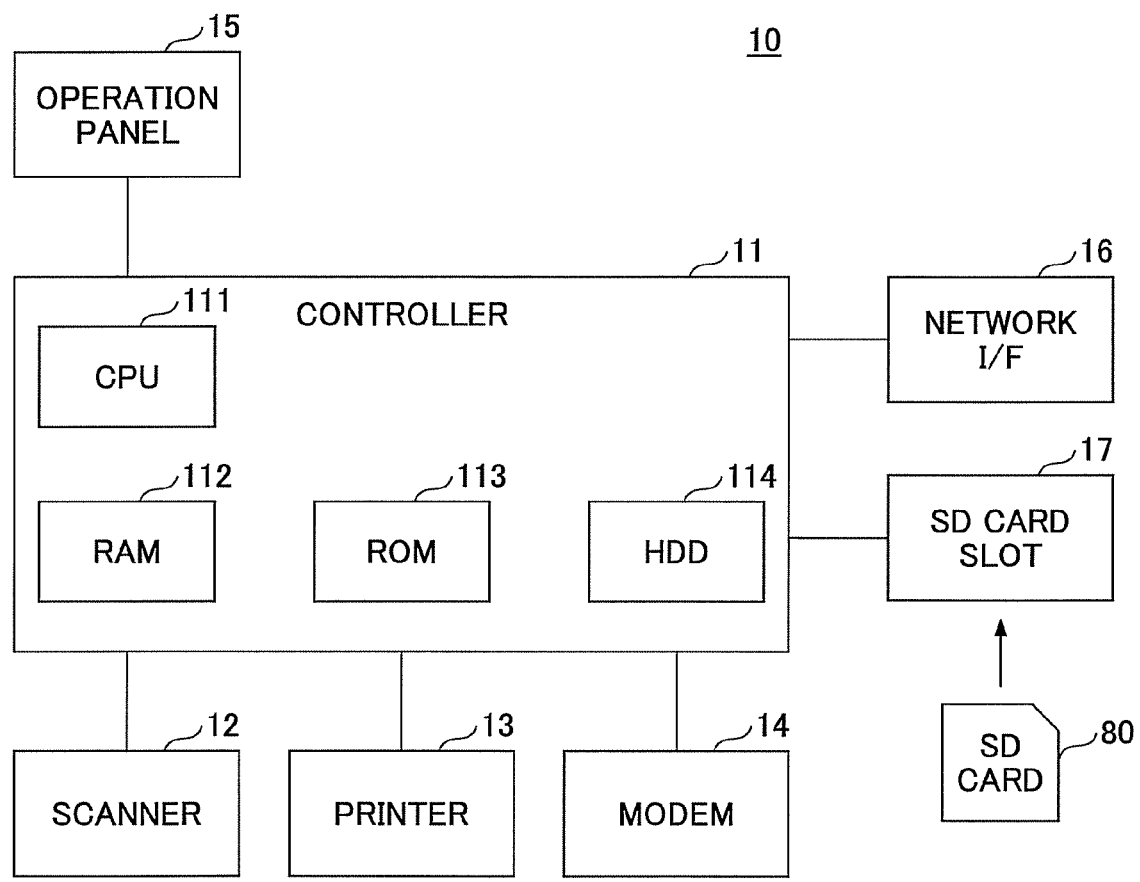
FIG. 2 is a block diagram illustrating an example of a hardware structure of an image forming apparatus in one embodiment of the present invention.

FIG. 2 is a block diagram illustrating an example of a hardware structure of the image forming apparatus in one embodiment of the present invention. The hardware of image forming apparatus 10 illustrated in FIG. 2 includes a controller 11, a scanner 12, a printer 13, a modem 14, an operation panel 15, a network interface (I/F) 16, and a SD (Secure Digital) card slot 17.

The controller 11 includes a CPU (Central Processing Unit) 111, a RAM (Random Access Memory) 112, a ROM (Read Only Memory) 113, and a HDD (Hard Disk Drive) 114. The ROM 113 stores various programs and data used by the programs. The RAM 112 provides storage regions for loading the programs, and work regions for the loaded programs. The CPU 111 executes the programs loaded to the RAM 112 to perform various functions. The HDD 114 is used to store programs and various data used by the programs.

The scanner 12 forms a hardware for reading image data from a document. The printer 13 forms a hardware for printing print data on a printing medium such as paper. The modem 14 forms a hardware for connecting the image forming apparatus 10 to a telephone line, and is used to transmit and receive image data in a facsimile communication. The operation panel 15 forms a hardware provided with an input device or means, such as buttons, for accepting inputs from the user, and a display unit or means, such as an LCD (Liquid Crystal Display). The network I/F 16 forms a hardware for connecting the image forming apparatus 10 to a network, such as a LAN, where the network may be a cable network, a wireless network or, a combination of cable and wireless networks. The SD card slot 17 is used to read one or more programs recorded in a SD card 80. Hence, not only the programs stored in the ROM 113 but also the programs stored in the SD card 80 are loaded into the RAM 112 and executed by the CPU 111 in the image forming apparatus 10.

FIG. 2 illustrates the hardware structure of the new image forming apparatus 10, however, the hardware structure illustrated in FIG. 2 may also be used for the existing image forming apparatus 20.

Figure 3:
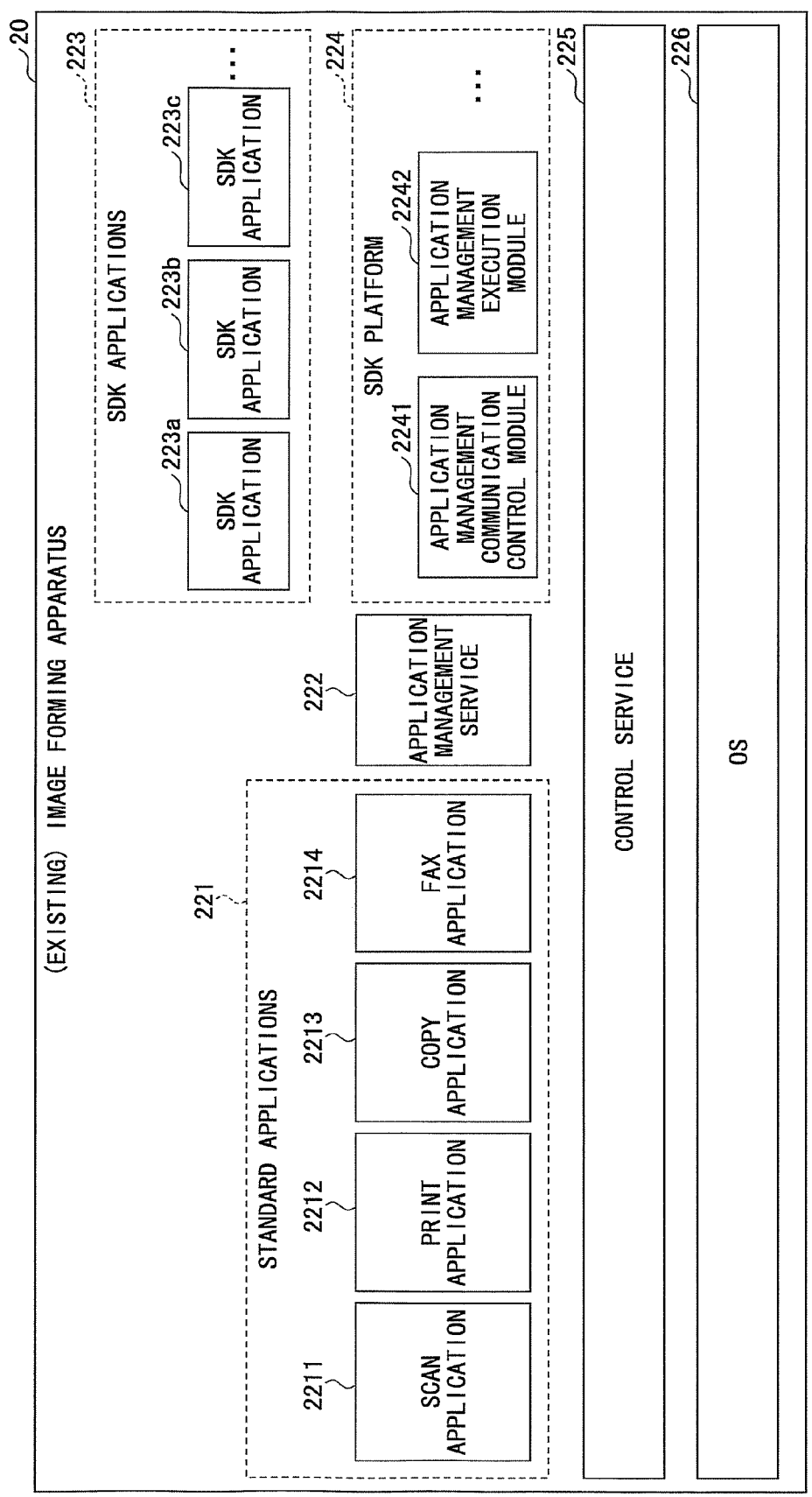
FIG. 3 is a diagram illustrating an example of a software structure of an existing image forming apparatus.

FIG. 3 is a diagram illustrating an example of a software structure of the existing image forming apparatus. The existing image forming apparatus 20 illustrated in FIG. 3 includes standard applications 221, an application management service 222, SDK (Software Development Kit) applications 223, a SDK platform 224, a control service 225, and an OS (Operating System) 226. Each software of the existing image forming apparatus 20 is started as a process or a thread on the OS 226.

The standard applications 221 form a group (or set) of applications that are preinstalled in the existing image forming apparatus 20 as standard features when being forwarded. In this example, the standard applications 221 include a scan application 2211, a print application 2212, a copy application 2213, and a facsimile application 2214. The scan application 2211 executes a scan job. The print application 2212 executes a print job. The copy application 2213 executes a copy job. The facsimile application 2214 executes a facsimile transmission job or a facsimile reception job.

The control service 225 is formed by a group (or set) of software modules that provide functions of controlling various hardware resources with respect to an application in a higher level of the hierarchical structure. For example, the control service 225 includes a network communication function, a scanner control function, a printer control function, and a memory management function.

The SDK applications 223 are additionally installed as plug-ins in order to expand the functions of the existing image forming apparatus 20 after the existing image forming apparatus 20 is forwarded. The SDK applications 223 illustrated in FIG. 3 include SDK applications 223a, 223b, and 223c.

The SDK platform 224 provides an execution environment for the SDK applications 223. In other words, the SDK platform 224 forms an application platform (or program execution environment providing unit or means) for the SDK applications 223. Each SDK application 223 is developed using the API provided by the SDK platform 224. The API of the SDK platform 224 is made public or open, and thus, the SDK applications 223 may be developed by a third party vendor, for example. The API is a set of functions or methods. The API may include a mechanism for notifying to the SDK applications 223 events or the like that are generated asynchronously.

The SDK platform 224 illustrated in FIG. 3 includes an application management communication control module 2241, and an application management execution module 2242. The application management communication control module 2241 accepts (or receives) requests that are in accordance with predetermined interface specifications (or request (or command) specifications or, request formats) using HTTP (HyperText Transfer Protocol), and inputs the requests to the application management execution module 2242. The application management execution module 2242 carries out a process corresponding to the accepted request, amongst various processes related to the management of the SDK applications 223, in response to the accepted request. The application management communication module 2241 forms result information that indicates results of the process carried out by the application management execution module 2242 into a format in accordance with the predetermined interface specifications, and returns a response including the result information in accordance with the predetermined interface specifications to an input source of the request.

The application management service 222 provides a user interface related to the management of the SDK applications 223. More particularly, the application management service 222 displays each kind of screen related to the management of the SDK applications 223 on the operation panel of the existing image forming apparatus 20. The application management service 222 inputs (or sends) the request in accordance with the predetermined interface specifications to the application management communication control module 2241 using the HTTP, in response to an instruction that is input via a displayed screen. The application management service 222 displays, on the operation panel, the result information that is output (returned) with respect to the input request.

Hence, the application management mechanism of the existing image forming apparatus 20 is formed by the application management service 222, the application management communication control module 2241, and the application management execution module 2242.

The management of the application includes management of a life cycle or state of the application. More particularly, the management of the application may include controlling execution of the install, start, stop, and uninstall of the application, confirming list information of installed applications, and the like.

The application management communication control module 2241 is interposed between the application management service 222 and the application management execution module 2242, because the application management service 222 and the application management execution module 2242 are implemented using mutually different programming languages. In other words, the SDK platform 224 and the SDK applications 223 of the existing image forming apparatus 20 are implemented using the JAVA (registered trademark) programming language (hereinafter simply referred to as "Java language"). On the other hand, the control service 225, the standard applications 221, and the application management service 222 of the existing image forming apparatus 20 are implemented using the C language.

Accordingly, in order for the application management service 222 to directly call the application management execution module 2242 that is implemented using the Java language, a special mechanism is required to enable the program in the C language to call the program in the Java language. Hence, the application management communication control module 2241 is provided in order to avoid implementing such a special mechanism. By interposing the application management communication control module 2241 between the application management service 222 and the application management execution module 2242, the application management service 222 may input a request with respect to the application management execution module 2242 using the HTTP communication that is neutral (that is, having a low dependence on the programming language) with respect to the programming language. If a communication that is neutral with respect to the programming language may be secured, the communication protocol between the application management service 222 and the application management communication control module 2241 is of course not limited to the HTTP. Examples of standardized communication protocols other than the HTTP that may be used between the application management service 222 and the application management communication control module 2241 include a dedicated (or exclusive) communication protocol, SOAP (Simple Object Access Protocol), and the like.

Figure 4:
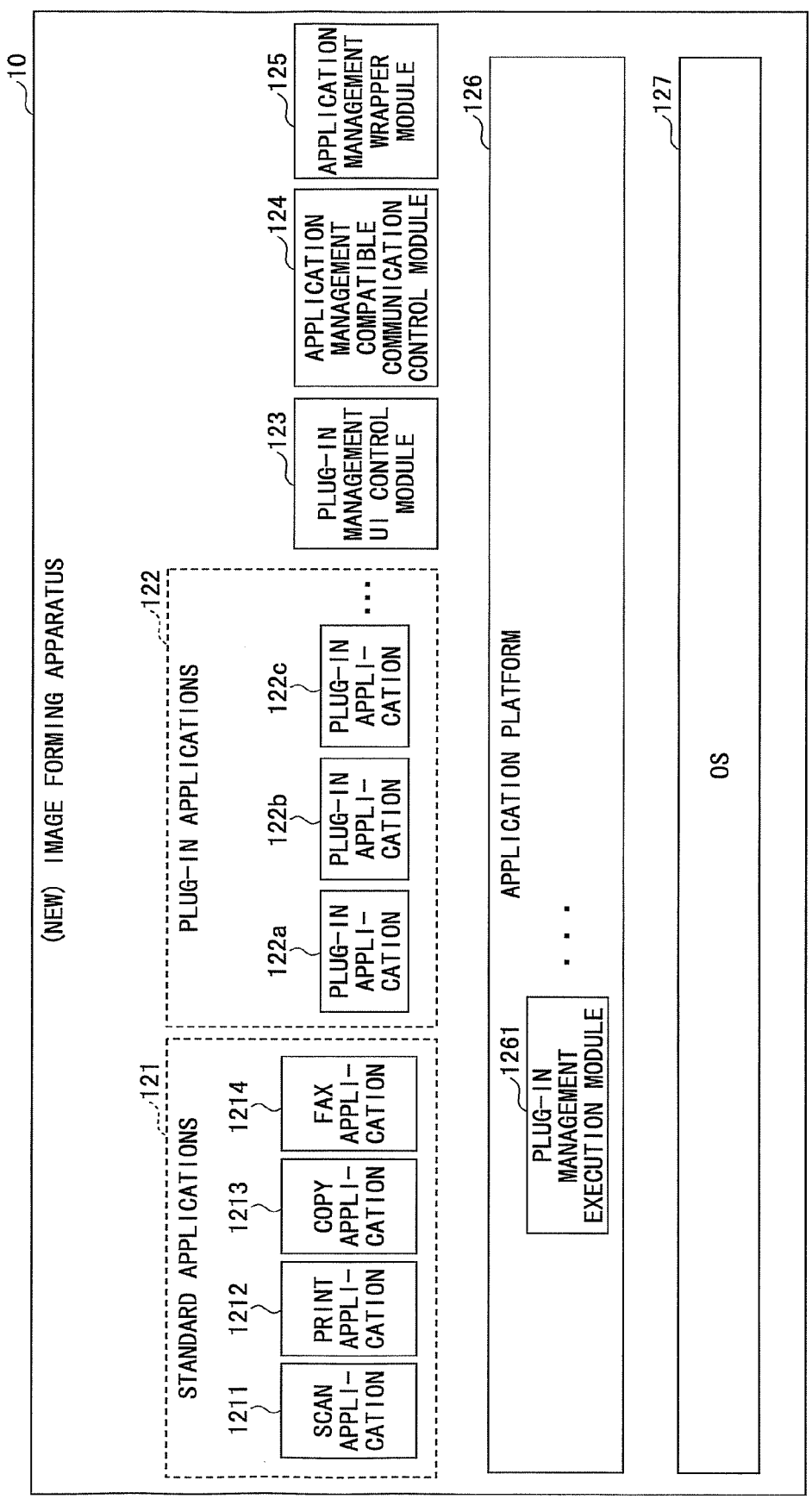
FIG. 4 is a diagram illustrating an example of the software structure of a new image forming apparatus.

FIG. 4 is a diagram illustrating an example of the software structure of the new image forming apparatus. The new image forming apparatus 10 illustrated in FIG. 4 includes standard applications 121, plug-in applications 122, a plug-in management UI (User Interface) control module 123, an application management compatible communication control module 124, an application management wrapper module 125, an application platform 126, and an OS (Operating System) 127. Each software of the new image forming apparatus 10 is started as a process or a thread on the OS 127.

The standard applications 121 form a group (or set) of applications that are preinstalled in the new image forming apparatus 10 as standard features when being forwarded. In this example, the standard applications 121 include a scan application 1211, a print application 1212, a copy application 1213, and a facsimile application 1214. The scan application 1211 executes a scan job, the print application 1212 executes a print job, the copy application 1213 executes a copy job, and the facsimile application 1214 executes a facsimile transmission job or a facsimile reception job, similarly to the standard applications 221 of the existing image forming apparatus 20 described above.

The plug-in applications 122 are additionally installed in order to expand the functions of the new image forming apparatus 10 after the new image forming apparatus 10 is forwarded. Hence, the plug-in applications 122 are similar in this respect to the SDK applications 223 of the existing image forming apparatus 20 described above. The plug-in applications 122 illustrated in FIG. 4 include plug-in applications 122a, 122b, and 122c.

The application platform 126 provides an execution environment for the applications, including the standard applications 121 and the plug-in applications 122, in the new image forming apparatus 10. In other words, the application platform 126 forms an application platform (or program execution environment providing unit or means) for the plug-in applications 122. Hence, in the new image forming apparatus 10, the standard applications 121 and the plug-in applications 122 operate on the same platform, namely, the application platform 126.

The application platform 126 is implemented using the Java language. For this reason, the standard applications 121, the plug-in applications 122, the plug-in management UI control module 123, the application management compatible communication control module 124, and the application management wrapper module 125 which operate on the application platform 126 are all implemented using the Java language.

Each application or module for the new image forming apparatus 10 is developed using the API provided by the application platform 126. The API of the application platform 126 is made public or open, and thus, the plug-in applications 122 may be developed by a third party vendor, for example. The API of the application platform 126 of the new image forming apparatus 10 has no compatibility with the API of the SDK platform 224 of the existing image forming apparatus 20. Hence, there is no compatibility between the plug-in applications 122 and the SDK applications 223. In addition, the management mechanism (or management format) for the plug-in applications 122 in the new image forming apparatus 10 is different from the management mechanism (or management format) for the SDK applications 223 in the existing image forming apparatus 20.

That is, in the new image forming apparatus 10, the management mechanism for the plug-in applications 122 is formed by a plug-in management execution module 1261 included in the application platform 126, and the plug-in management US control module 123 operating on the application platform 126. The plug-in management execution module 1261 executes a process, amongst the various processes related to the management of the plug-in applications 122, corresponding to a request in accordance with the predetermined interface specifications, in response to the request that is input. The plug-in management execution module 1261 forms result information that indicates results of the process carried out by the plug-in management execution module 1261 into a format in accordance with the predetermined interface specifications, and returns a response including the result information in accordance with the predetermined interface specifications to an input source of the request.

The plug-in management UI control module 123 provides a user interface related to the management of the plug-in applications 122. More particularly, the plug-in management UI control module 123 displays various screens related to the management of the plug-in applications 122 on the operation panel 15 of the new image forming apparatus 10. The plug-in management UI control module 123 inputs a request in accordance with the predetermined interface specifications to the plug-in management execution module 1261, in response to an instruction that is input via the displayed screen. The plug-in management UI control module 123 displays, on the operation panel 15, the result information that is output (returned) with respect to the input request.

In other words, the plug-in management UI control module 123 corresponds to the application management service 222 of the existing image forming apparatus 20, and the plug-in management execution module 1261 corresponds to the application management execution module 2242 of the existing image forming apparatus 20. However, the interface specifications (or API specifications) of the plug-in management execution module 1261 in the new image forming apparatus 10 and the interface specifications (or API specifications) of the application management execution module 2242 in the existing image forming apparatus 20 are different. However, the interface specifications of the plug-in management execution module 1261 of course do not exclude the format using the HTTP communication.

The application management compatible communication control module 124 and the application management wrapper module 125 absorb the differences between the interface specifications, in order to enable the application management service 222 to use the plug-in management execution module 1261. That is, the application management compatible communication module 124 provides an interface in accordance with the interface specifications identical to those of the application management communication control module 2241, and inputs the request input via the interface to the application management wrapper module 125. The application management wrapper module 125 accepts the request by an interface in accordance with the interface specifications identical to those of the application management execution module 2242, converts the accepted request into a format in accordance with the interface specifications of the plug-in management execution module 1261, and inputs the request (or converted request) having the converted format to the plug-in management execution module 1261.

Figure 5:
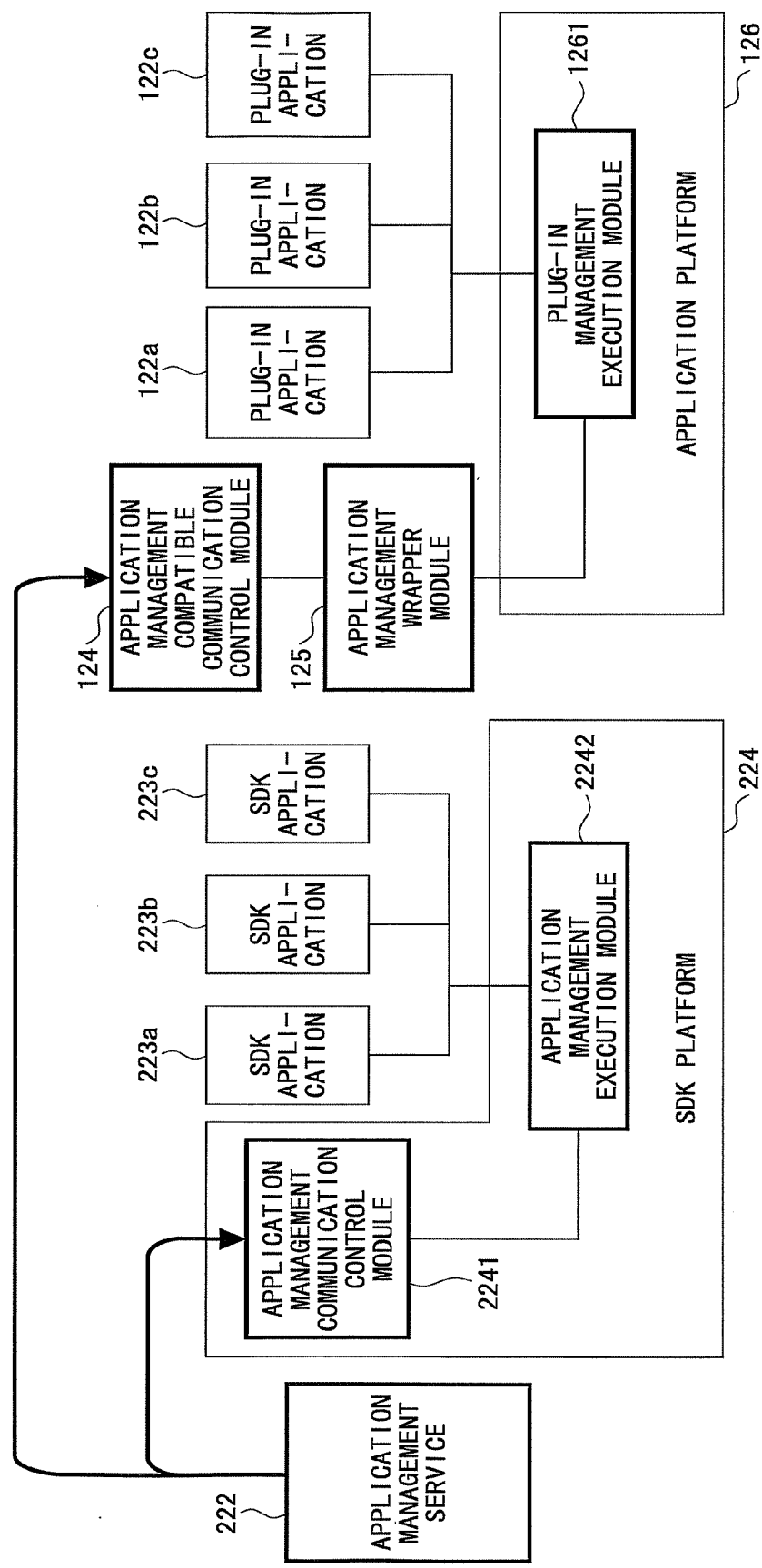
FIG. 5 is a diagram for explaining a mechanism for integrating an application management mechanism of the new image forming apparatus an application management mechanism of the existing image forming apparatus.

Accordingly, by the provision of the application management compatible communication control module 124 and the application management wrapper module 125, the application management mechanism of the new image forming apparatus 10 and the application management mechanism of the existing image forming apparatus 20 may be integrated as illustrated in FIG. 5.

FIG. 5 is a diagram for explaining a mechanism for integrating the application management mechanism of the new image forming apparatus the application management mechanism of the existing image forming apparatus.

As illustrated in FIG. 5, the application management service 222 may input a request with respect to the application management compatible communication control module 124 of the new image forming apparatus 10 by the HTTP communication. The application management compatible communication control module 124 may input the request with respect to the application management wrapper module 125 by a process similar to the process carried out by the application management communication control module 2241. Accordingly, the application management compatible communication control module 124 may form the application management communication control module 2241 itself, because the application management wrapper module 125 provides the same interface as the application management execution module 2242.

The application management wrapper module 125 converts the input request into a format in accordance with the interface specifications of the plug-in management execution module 1261, and inputs the request having the converted format to the plug-in management execution module 1261. The plug-in management execution module 1261 executes a process according to the input request, and outputs result information of the process to the application management wrapper module 125. The application management wrapper module 125 converts the result information into a format in accordance with the interface specifications of the application management execution module 2242, and returns the result information having the converted format to the application management compatible communication control module 124. The application management compatible communication control module 124 returns the result information that has the converted format and is returned, to the application management service 222, using the HTTP communication according to the interface specifications of the application management communication control module 2241.

Hence, the user may manage via the operation panel of the existing image forming apparatus 20, not only the SDK applications 223 of the existing image forming apparatus 20 but also the plug-in applications 122 of the new image forming apparatus 10.

Next, a description will be given of procedures of each process illustrated in FIG. 5, in relation to the processing contents that may include install, start, stop, and uninstall.

Figure 6:
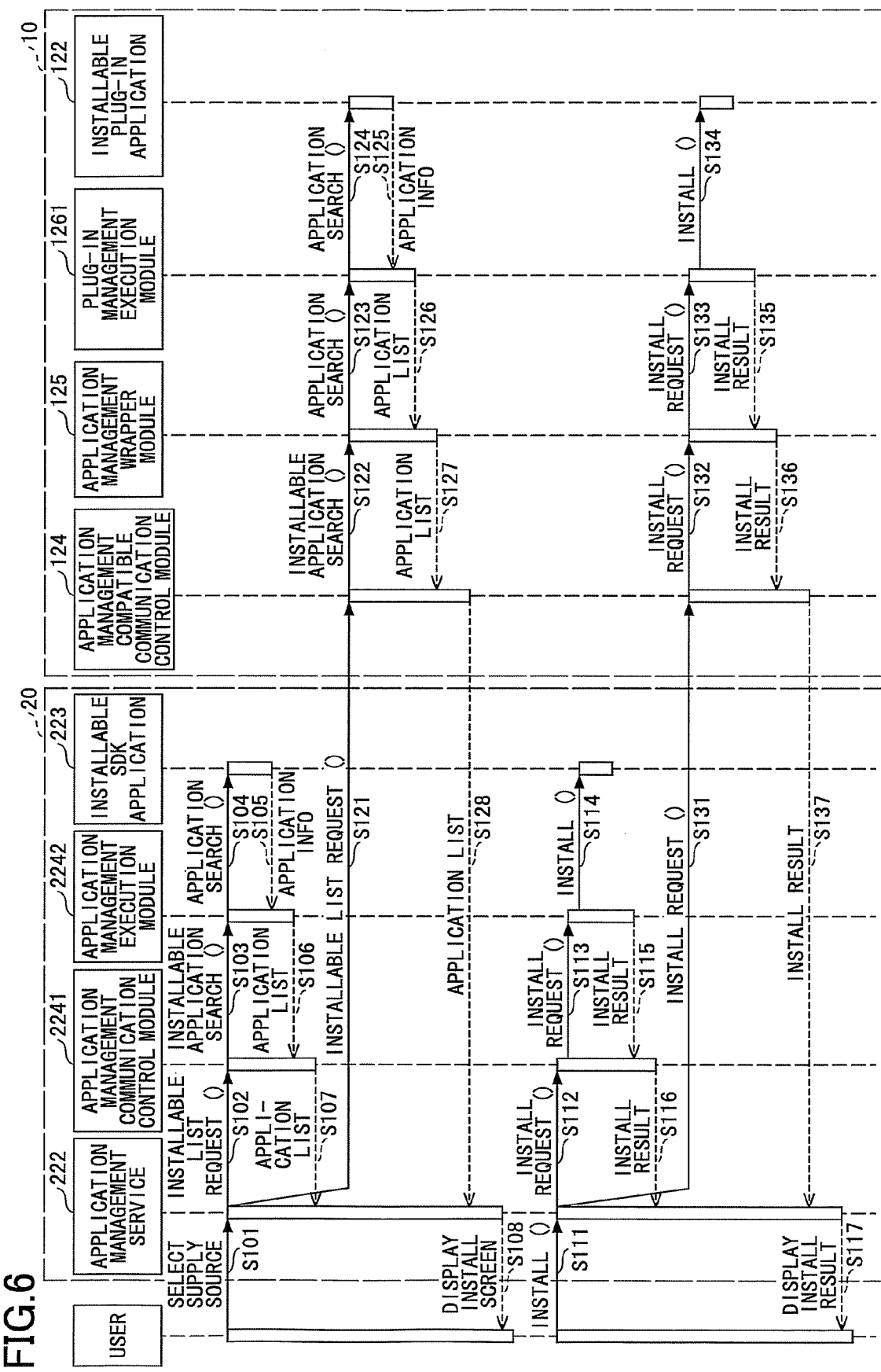
FIG. 6 is a sequence diagram for explaining procedures of an application install process.

FIG. 6 is a sequence diagram for explaining procedures of an application install process. In FIG. 6 and subsequent sequence diagrams, it is assumed for the sake of convenience that the work place of the user is the set-up location of the existing image forming apparatus 20.

When the user selects, via the operation panel of the existing image forming apparatus 20, the application management service 222 as a using target, the application management service 222 displays an expanded function initial setting screen on the operation panel of the existing image forming apparatus 20.

Figure 7:
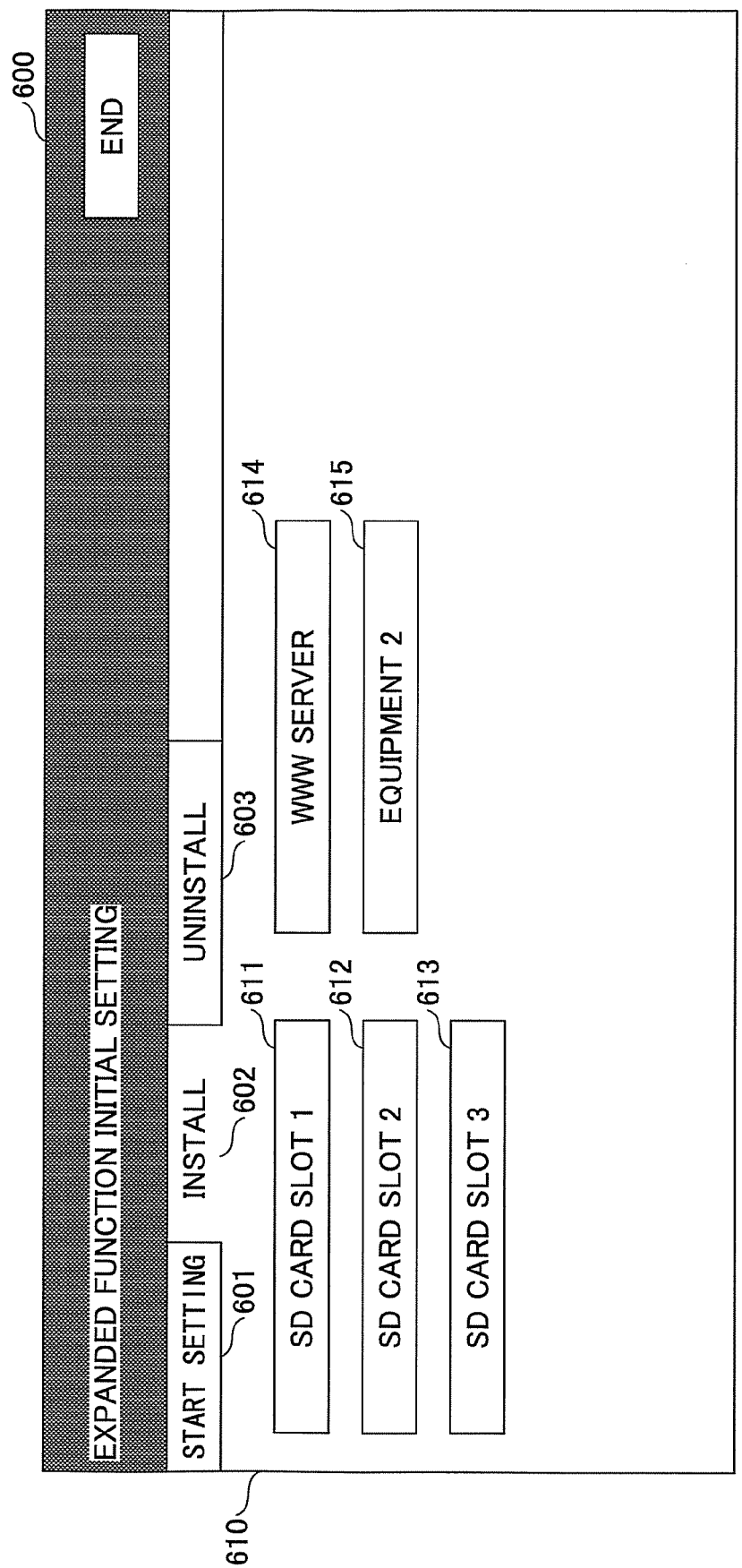
FIG. 7 is a diagram illustrating an example of a display of an expanded function initial setting screen.

FIG. 7 is a diagram illustrating an example of the display of the expanded function initial setting screen. In FIG. 7, an expanded function initial setting screen 600 includes a start setting tab 601, an install tab 602, and an uninstall tab 603. These tabs 601, 602 and 603 are display parts that are selected to switch display contents of the expanded function initial setting screen 600 depending on the needs. FIG. 7 illustrates a state where the install tab 602 is selected and an install initial screen 610 is displayed.

In the install initial screen 610, buttons 611 through 614 may be pushed (or selected) in order to select an acquisition destination of the SDK application 223 that is to be installed in the existing image forming apparatus 20 (that is, a supply source of the SDK application 223). A button 615 may be pushed to in order to select an image forming apparatus other than the existing image forming apparatus 20 as an install destination. In this embodiment, the image forming apparatus other than the existing image forming apparatus 20, that may be selected by the button 615, is the new image forming apparatus 10.

Of course, if a certain image forming apparatus, other than the new image forming apparatus 10, whose application management mechanism may be integrated with that of the existing image forming apparatus 20, is connected to the network 50, a button corresponding to the certain image forming apparatus is displayed on the install initial setting screen 610. For example, the buttons for selecting the install destinations may be displayed based on a result of a search for image forming apparatuses connected to the network 50, executed by the application management service 222 or another program module. In addition, the buttons for selecting the install destinations may be displayed based on list information that indicates the image forming apparatuses connected to the network 50 and is prestored in a storage unit (not illustrated), for example.

In the state illustrated in FIG. 7, when one of the buttons 611 through 614 is pushed in a step S101, the application management service 222 judges that the install destination is a local image forming apparatus, that is, the existing image forming apparatus 20. Hence, the application management service 222 specifies an identifier of the supply source corresponding to the button that is pushed, and sends an acquisition request for the list information (or installable list) of the installable SDK applications 223 by HTTP communication with respect to the application management communication control module 2241, in a step S102. The identifier of the supply source is the identifier of the SD card slot when one of the buttons 611 through 613 is pushed. On the other hand, the identifier of the supply source is the identifier (for example, URL (Uniform Resource Locator)) of a predetermined WWW server when the button 614 is pushed.

The application management communication control module 2241 specifies the identifier of the supply source of the SDK application 223 in response to receiving the acquisition request for the installable list, and requests a search for the installable SDK applications 223 with respect to the application management execution module 2242, in a step S103. Then, the application management execution module 2242 searches for the SDK applications 223 stored at the specified supply source, in steps S104 and S105. For example, if the identifier indicates the SD card slot, the application management execution module 2242 searches for the SDK applications 223 stored in a predetermined folder of the SD card that is set in the SD card slot indicated by the identifier. On the other hand, if the identifier indicates the WWW server, the application management execution module 2242 searches for the installable SDK applications 223 from the WWW server indicated by the identifier. In either case where the supply source is the SD card slot or the WWW server, application information is acquired as the search result for each installable SDK application 223. The application information refers to attribute information of the SDK application 223, that is recorded in a predetermined file annexed to the SDK application 223 (for example, recorded within the same document file as the SDK application 223).

FIG. 8 is a diagram illustrating an example of the application information related to a single SDK application. The application information illustrated in FIG. 8 is written in a XML (eXtensible Markup Language) format having, as a root element, an application element that is sandwiched between <application> tags.

Each child element of the application element corresponds to an attribute item of the SDK application 223. In other words, the value of a "productid" element indicates the value of a product ID. The product ID is a unique ID assigned in units of products (that is, in units of models) of the SDK application 223. The value of a "name" element indicates an application name. The value of a "description" element indicates a description related to the SDK application 223. The value of a "state" element indicates a state of the SDK application 223. The state element "noninstalled" in FIG. 8 indicates a noninstalled state. In other words, the application information is installed together with the SDK application 223. When the SDK application 223 is installed and the state of the SDK application 223 changes, the value of the state element is updated to a value that indicates the state after this change. A "version" element indicates a version of the SDK application 223. The value of an "original" element indicates the supply source of the SDK application 223 (for example, the SD card or the WWW server). The original element "sd" in FIG. 8 indicates the SD card (or SD card slot). The value of a "vendor" element indicates a developing vendor of the SDK application 223. The values of an "e-mail" element, a "tel" element, and a "fax" element respectively indicate an e-mail address, a telephone number, and a facsimile number of the developing vendor. An "autorun" element indicates whether an automatic start is to be made (that is, true) or no automatic start is to be made (that is, false). The automatic start refers to an automatic start, as a thread, in response to the start of the existing image forming apparatus 20, for example, and not in response to a start instruction which will be described later.

In the steps S104 and S105, the application information illustrated in FIG. 8 is acquired for each SDK application 223 that is found as being installable as a result of the search. Next, the application management execution module 2242 outputs a list (or application list) of the acquired application information with respect to the application management communication control module 2241, in a step S106. The application management communication control module 2241 returns the application list to the application management service 222 by the HTTP communication, in a step S107.

The application management service 222 displays an installable list screen in the expanded function initial setting screen 600, based on the application list returned thereto, in a step S108.

Figure 9:
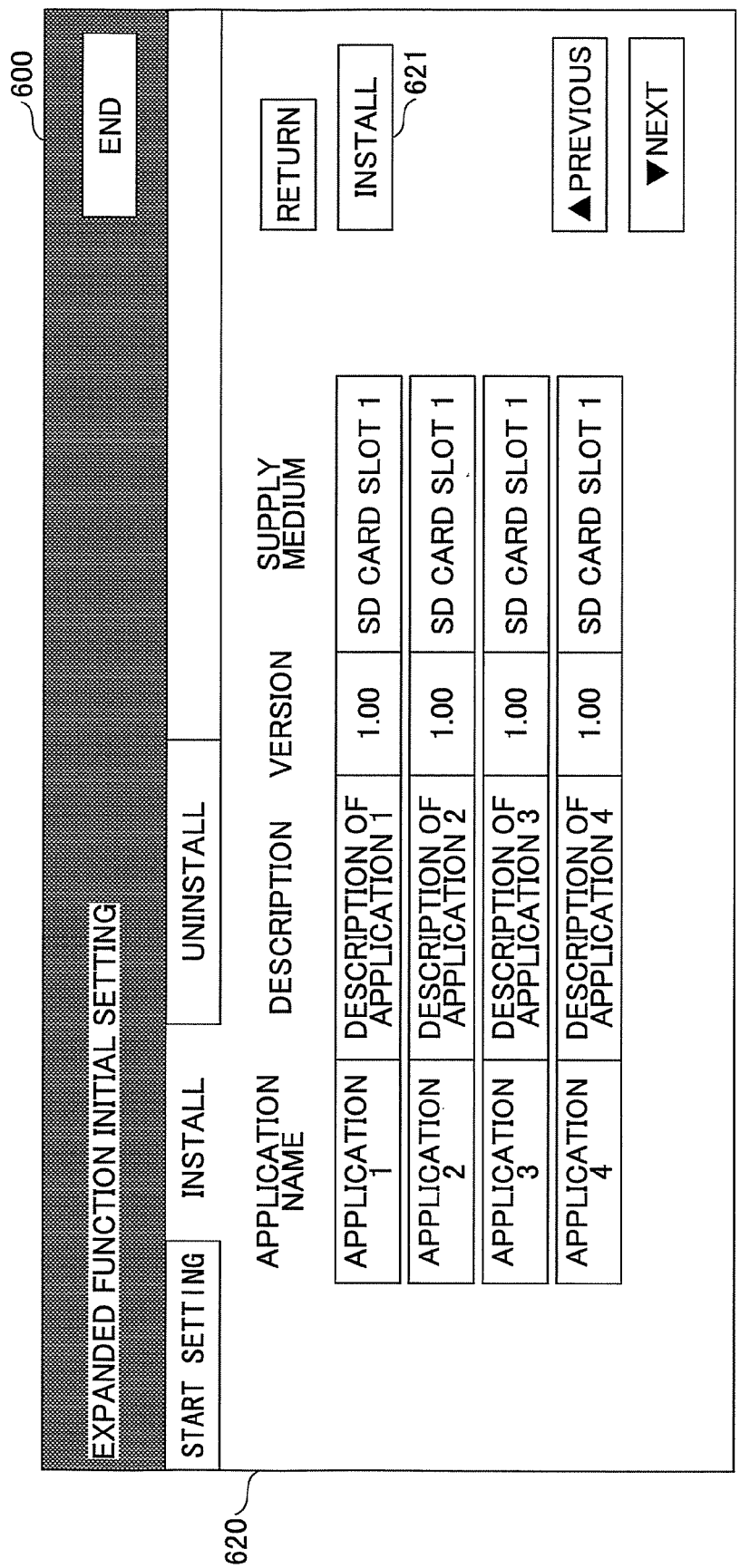
FIG. 9 is a diagram illustrating an example of a display of an installable list screen related to the existing image forming apparatus.

FIG. 9 is a diagram illustrating an example of the display of the installable list screen related to the existing image forming apparatus. In FIG. 9, an installable list screen 620 displays a list of installable SDK applications 223. Items of the list include the application name, the description, the version, and the supply medium for each SDK application 223. The values of the items of the list are acquired from the application information of each SDK application 223.

When a desired SDK application 223 is selected from the list of the installable list screen 620 and an install button 621 is pushed in a step S111, the application management service 222 specifies the product ID and the identifier of the supply source of the selected SDK application 223, and sends an install request for the SDK application 223 by the HTTP communication with respect to the application management communication control module 2241, in a step S112. The application management communication control module 2241 specifies the product ID and the identifier of the supply source of the SDK application 223, and requests installing of the SDK application 223 with respect to the application management execution module 2242, in response to receiving the install request, in a step S113. Then, the application management execution module 2242 installs the SDK application 223 having the specified product ID into the existing image forming apparatus 20, from among the SDK applications 223 stored at the specified supply source, in a step S114. By this installing of the SDK application 223, the application information of the installed SDK application 223 is updated and stored in a predetermined storage unit.

FIG. 10 is a diagram illustrating an example of the application information updated by the installing. Compared to the application information illustrated in FIG. 8, the value of the "state" element is updated to "stopped" in the application information illustrated in FIG. 10. This updated value indicates that the selected SDK application 223 has been installed, and that this SDK application 223 is stopped (that is, not started). In addition, in the application information illustrated in FIG. 10, a "destination" element is written in place of the "origin" element. The value of this "destination" element indicates the identifier of the install destination. Further, "sd1" in FIG. 10 indicates the SD card. In other words, the storage location of the installed SDK application 223 may be within the SD card and not within the storage unit of the existing image forming apparatus 20.

After the install process described above is completed, the application management execution module 2242 outputs result information of the install process with respect to the application management communication control module 2241, in a step S115. The application management communication control module 2241 returns the result information to the application management service 222 by the HTTP communication, in a step S116. The application management service 222 displays the result information returned thereto in the expanded function initial setting screen 600, in a step S117.

On the other hand, when the button 615 is selected (or pushed) in the install initial screen 610 illustrated in FIG. 7, the application management service 222 displays a screen that includes buttons, similar to the buttons 611 through 614, for selecting the acquisition destination of the plug-in application 122 (that is, supply source of the plug-in applications 122) to be installed into the new image forming apparatus 10, and a button for selecting the existing image forming apparatus 20 as the install destination to return to the state illustrated in FIG. 7.

When one supply source is selected on the above screen that is displayed by the application management service 222 in a step S101, the application management service 222 judges that the install destination is the remote image forming apparatus which is the new image forming apparatus 10 in this example. Hence, the application management service 222 specifies the identifier of the selected supply source, and sends an acquisition request for the list information (or installable list) of the installable plug-in applications 122 by the HTTP communication with respect to the application management compatible communication control module 124 of the new image forming apparatus 10, in a step S121.

The application management compatible communication control module 124 specifies the identifier of the supply source of the plug-in applications 122, and requests a search for the installable plug-in applications 122 with respect to the application management wrapper module 125, in response to receiving the acquisition request for the installable list, in a step S122. The application management wrapper module 125 converts the request to search for the installable list into a format in accordance with the interface specifications of the plug-in management execution module 1261, and inputs the request (that is, a search request for the plug-in applications 122) having the converted format with respect to the plug-in management execution module 1261, in a step S123. Next, the plug-in management execution module 1261 searches for the plug-in applications 122 stored at the specified supply source, in steps S124 and S125. The application information is acquired for each installable plug-in application 122, as a search result, in a manner similar to the search result obtained for the SDK applications 223 described above. Then, the plug-in management execution module 1261 outputs the list of the acquired application information (or application list) with respect to the application management wrapper module 125, in a step S126. The application management wrapper module 125 converts the application information of the plug-in application 122 into a format in accordance with the application information of the SDK application 223, if the structure, data format or the like of the application information of the plug-in application 122 differs from that of the application information of the SDK application 223. The application management wrapper module 125 outputs the list of the application information (or application list) having the converted structure, data format or the like with respect to the application management compatible communication control module 124, in a step S127. The application management compatible communication control module 124 returns the application list to the application management service 222 by the HTTP communication, in a step S128.

The application management service 222 displays an installable list screen in the expanded function initial setting screen 600, based on the application list returned thereto, in a step S108.

Figure 11:
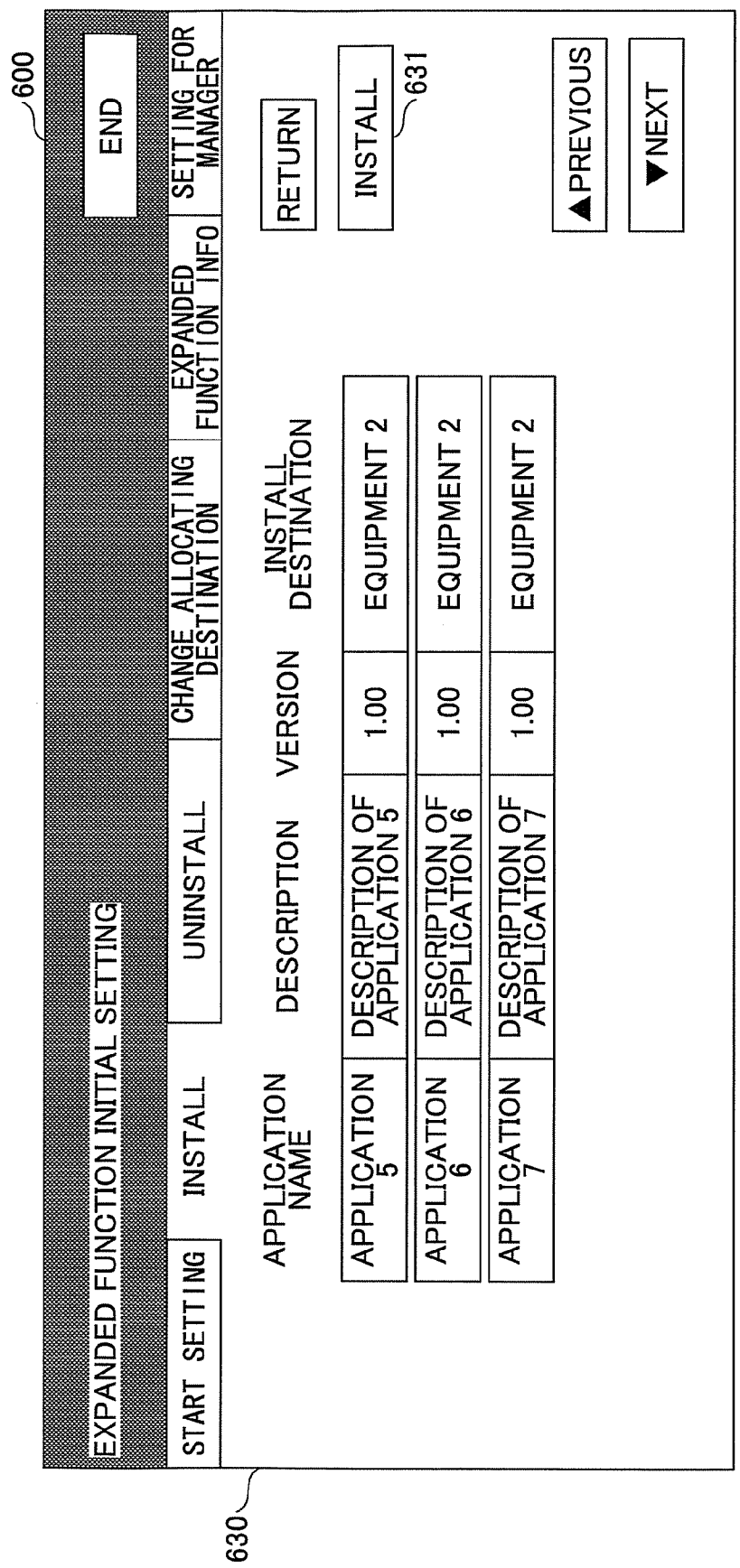
FIG. 11 is a diagram illustrating an example of a display of the installable list screen related to the new image forming apparatus.

FIG. 11 is a diagram illustrating an example of the display of the installable list screen related to the new image forming apparatus. An installable list screen 630 illustrated in FIG. 11 has a structure similar to that of the installable list screen 620 illustrated in FIG. 9. In other words, the installable list screen 630 displays a list of the installable plug-in applications 122. However, in this list of the installable plug-in applications 122, the items displayed for each plug-in application 122 include a name ("equipment 2") of the new image forming apparatus 10 at the install destination, in place of the supply medium.

When a desired plug-in application 122 is selected from the list in the installable list screen 630 and an install button 631 is pushed in a step S111, the application management service 222 specifies the product ID and the identifier of the supply source of the selected plug-in application 122, and sends an install request for the plug-in application 122 by the HTTP communication with respect to the application management compatible communication control module 124, in a step S131. The application management compatible communication control module 124 specifies the product ID and the identifier of the supply source of the plug-in application 122, and requests installing of the plug-in application 122 with respect to the application management wrapper module 125, in response to receiving the install request, in a step S132. Then, the application management wrapper module 125 converts the install request into a format in accordance with the interface specifications of the plug-in management execution module 1261, and inputs the install request having the converted format with respect to the plug-in management execution module 1261, in a step S133. Thereafter, the plug-in management execution module 1261 installs the plug-in application 122 having the specified product ID into the new image forming apparatus 10, from among the plug-in applications 122 stored at the supply source specified by the install request, in a step S134. By this installing of the plug-in application 122, the application information of the installed plug-in application 122 is updated and stored in a predetermined storage unit. The updating contents of the application information of the installed plug-in application 122 may be similar to those of the application information of the installed SDK application 223 described above. However, the updating of the application information of the plug-in application 122 may not be the same as the updating of the application information of the SDK application 223, depending on the structure of the application information of the plug-in application 122.

After the install process is completed, the plug-in management execution module 1261 outputs result information of the install process with respect to the application management wrapper module 125, in a step S135. The application management wrapper module 125 converts the result information into a format in accordance with the interface specifications of the application management execution module 2242, and outputs the result information having the converted format with respect to the application management compatible communication control module 124, in a step S136. The application management compatible communication control module 124 returns the result information to the application management service 222 by the HTTP communication, in a step S137. The application management service 222 displays the result information in the expanded function initial setting screen 600, in a step S117.

In the steps S121, S128, S131, and S137 described above, the application management service 222 does not recognize that the install target is the plug-in application 122. In other words, the application management service 222 carries out a process similar to that carried out when installing the SDK application 223 into the exiting image forming apparatus 20, also when installing the plug-in application 122 into the new image forming apparatus 10. This is because the application management compatible communication control module 124 provides the same interface as the application management communication control module 2241.

Figure 12:
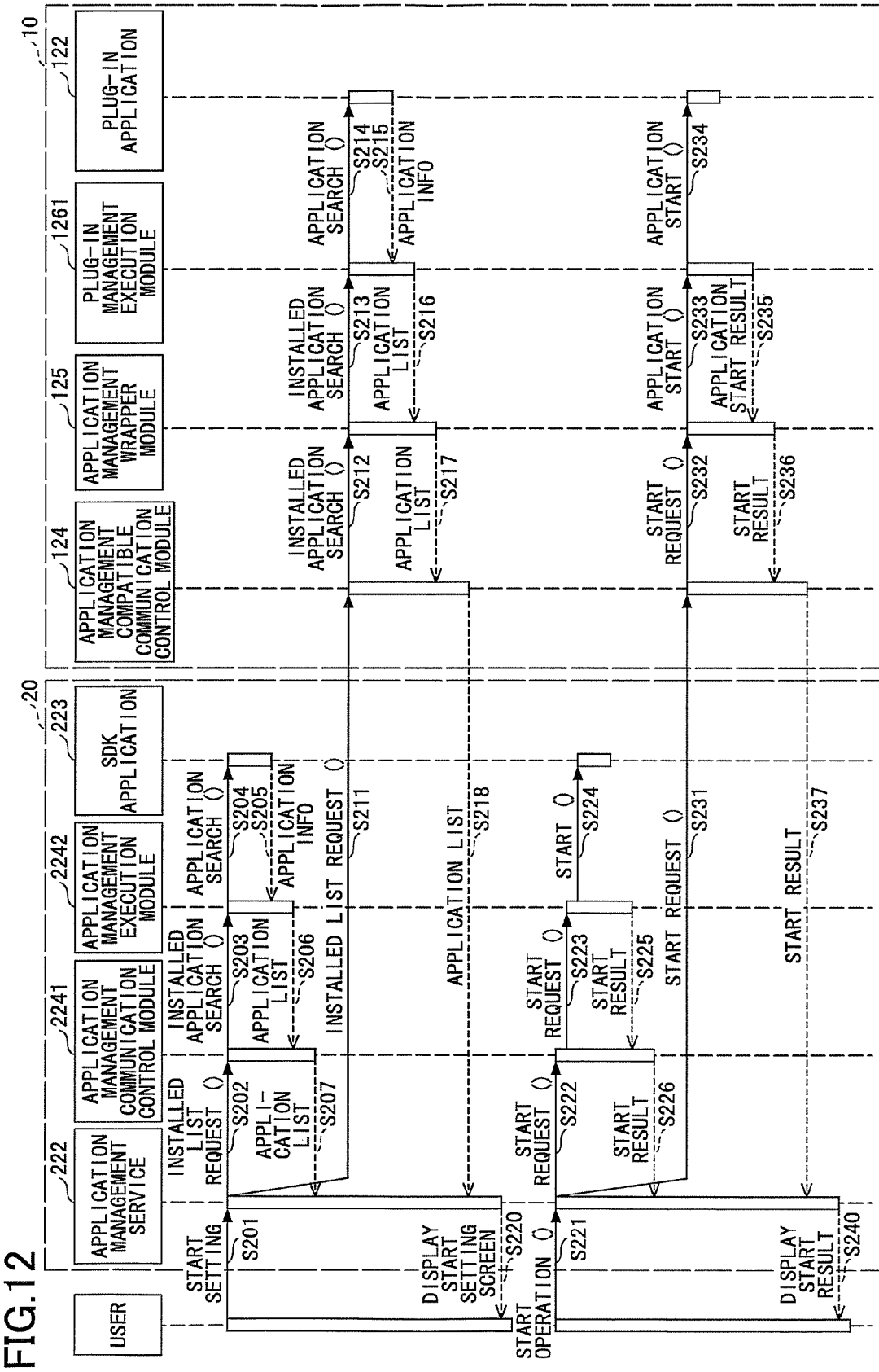
FIG. 12 is a sequence diagram for explaining procedures of an application start process.

Next, a description will be given of procedures of an application start process to start the installed application. FIG. 12 is a sequence diagram for explaining the procedures of the application start process.

When the user pushes the start set tab 601 on the expanded function initial setting screen 600 that is displayed on the display panel of the existing image forming apparatus 20 in a step S201, the application management service 222 sends an acquisition request for the list information (or installed list) of the installed SDK applications 223 with respect to the application management communication control module 2241 by the HTTP communication, in a step S202. The application management communication control module 2241 requests a search for the installed SDK applications 223 with respect to the application management execution module 2242 in response to receiving the acquisition request for the installed list, in a step S203. Then, the application management execution module 2242 searches for the installed SDK applications 223 in steps S204 and S205. More particularly, the application management execution module 2242 searches for the application information recorded in the predetermined storage unit by the installing of the SDK applications 223.

Next, the application management execution module 2242 outputs the list of the application information (or application list) that is found as a result of the search with respect to the application management communication control module

2241, in a step S206. The application management communication control module 2241 returns the application list to the application management service 222 by the HTTP communication, in a step S207.

In parallel with the step S202, the application management service 222 sends an acquisition request for the list information (or installed list) of the installed plug-in applications 122 with respect to the application management compatible communication control module 124 of the new image forming apparatus 10, in a step S211.

The application management compatible communication control module 124 requests a search (that is, a search request) for the installed plug-in applications 122 with respect to the application management wrapper module 125, in response to receiving the acquisition request for the installed list, in a step S212. The application management wrapper module 125 converts the search request into a format in accordance with the interface specifications of the plug-in management execution module 1261, and inputs the search request having the converted format with respect to the plug-in management execution module 1261, in a step S213. Then, the plug-in management execution module 1261 searches for the installed plug-in applications 122, in steps S214 and S215. A list (or application list) of the application information is acquired, as the search result, for each installed plug-in application 122, similarly to the search result for the installed SDK applications 223. The plug-in management execution module 1261 outputs the acquired application list of the application information with respect to the application management wrapper module 125, in a step S216. The application management wrapper module 125 converts the application information of the plug-in applications 122 into the format of the application information of the SDK applications 223. The application management wrapper module 125 outputs the application list of the application information, having the converted format, with respect to the application management compatible communication control module 124, in a step S217. The application management compatible communication control module 124 returns the application list to the application management service 222 by the HTTP communication, in a step S218.

Next, the application management service 222 displays a start setting screen in the expanded function initial setting screen 600, based on the application lists returned from the application management communication control module 2241 and the application management compatible communication control module 124, in a step S220.

Figure 13:
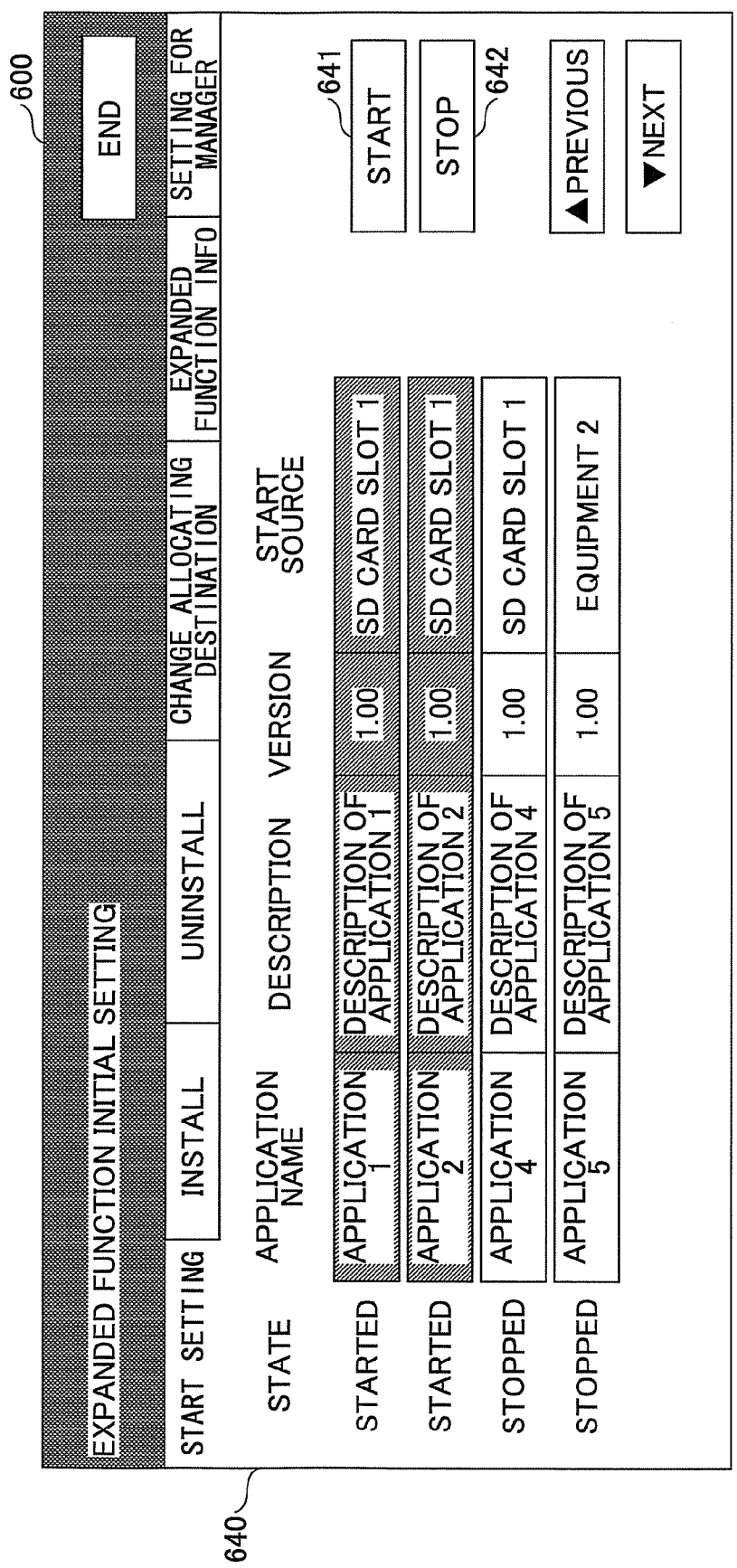
FIG. 13 is a diagram illustrating an example of a display of a start setting screen.

FIG. 13 is a diagram illustrating an example of the display of the start setting screen. In FIG. 13, a start setting screen 640 displays a list of installed SDK applications 223 or installed plug-in applications 122. Items of the list include the state (started or stopped), the application name, the description, the version, and the start source for each application. The values of the items of the list are acquired from the application information of each application.

When one of the applications having the state that is "stopped" is selected from the list in the start setting screen 640 and a start button 641 is pushed in a step S221, a start process is started. In a case where the application that is installed in the existing image forming apparatus 20 (that is, the SDK application 223 having a "SD card slot 1" as the start source in FIG. 13) is included in the selected application, the application management service 222 specifies the product ID of the selected SDK application 223, and sends a start request for the SDK application 223 to the application management communication control module 2241 by the HTTP communication, in a step S222. The application communication control module 2241 specifies the product ID of the SDK application 223, and requests the start of the SDK application 223 with respect to the application management execution module 2242, in response to receiving the start request, in a step S223. Then, the application management execution module 2242 starts the SDK application 223 (or the thread of the SDK application 223) having the specified product ID in the existing image forming apparatus 20, in a step S224. If the starting of the SDK application 223 in the existing image forming apparatus 20 is successful, the application management execution module 2242 updates the value of the "state" element in the application information of the started SDK application 223 to "started".

After the start process is completed, the application management execution module 2242 outputs the result information of the start process with respect to the application management communication control module 2241, in a step S225. The application management communication control module 2241 returns the result information to the application management service 222 by the HTTP communication, in a step S226.

In a case where the application selected as the start target includes the application installed in the new image forming apparatus 10 (for example, the plug-in application 122 having a name "equipment 2" as the start source in FIG. 13), the application management service 222 specifies the product ID of the selected plug-in application 122 and sends a start request for this plug-in application 122 with respect to the application management compatible communication control module 124 by the HTTP communication, in a step S231. The application management compatible communication control module 124 specifies the product ID of the plug-in application 122 and inputs the start request for the plug-in application 122 with respect to the application management wrapper module 125, in response to receiving the start request, in a step S232. The application management wrapper module 125 converts the start request into a format in accordance with the interface specifications of the plug-in management execution module 1261, and inputs the start request having the converted format with respect to the plug-in management execution module 1261, in a step S233. Then, the plug-in management execution module 1261 starts the plug-in application 122 (or the thread of the plug-in application 122) having the specified product ID in the new image forming apparatus 10, in a step S234. If the starting of the plug-in application 122 in the new image forming apparatus 10 is successful, the plug-in management execution module 1261 updates the value of the "state" element in the application information of the started plug-in application 122 to a value indicating "started".

After the start process is completed, the plug-in management execution module 1261 outputs the result information of the start process with respect to the application management wrapper module 125, in a step S235. The application management wrapper module 125 converts the result information into a format in accordance with the interface specifications of the application management execution module 2242, and outputs the result information having the converted format with respect to the application management compatible communication control module 124, in a step S236. The application management compatible communication control module 124 returns the result information to the application management service 222 by the HTTP communication, in a step S237.

Next, the application management service 222 updates the start setting screen 640 based on the result information returned from at least one of the application management communication control module 2241 and the application management compatible communication control module 124, in a step S240.

Figure 14:
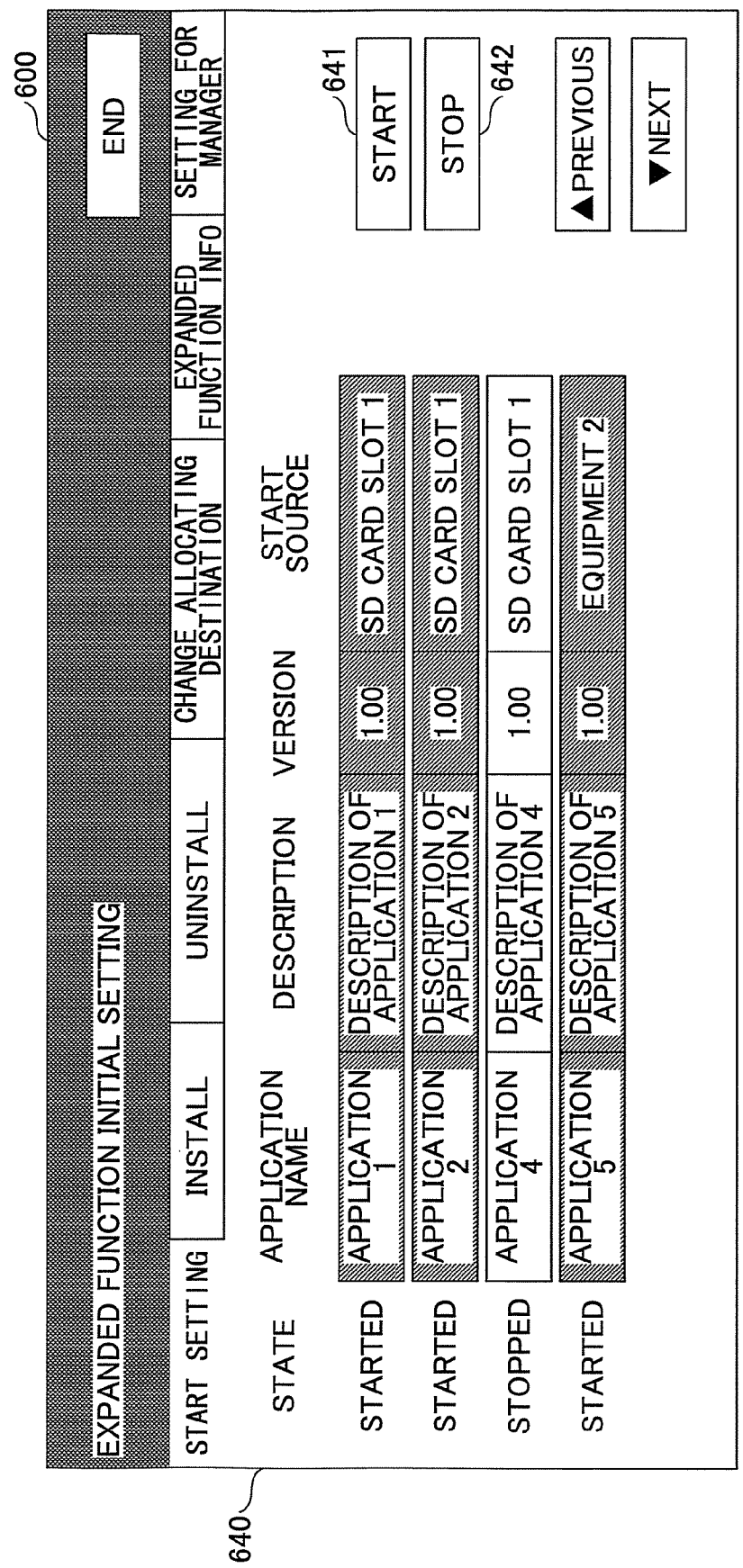
FIG. 14 is a diagram illustrating an example of the display of the start setting screen updated by the starting of the application.

FIG. 14 is a diagram illustrating an example of the display of the start setting screen updated by the starting of the application. In the start setting screen 640 illustrated in FIG. 14, the state of the application (that is, the plug-in application 122) in the fourth line has been updated to "started". Hence, FIG. 14 illustrates a case where the plug-in application 122 is selected as the start target, and the display illustrated in FIG. 14 is made as a result of executing the steps S231 through S240 in FIG. 12.

Figure 15:
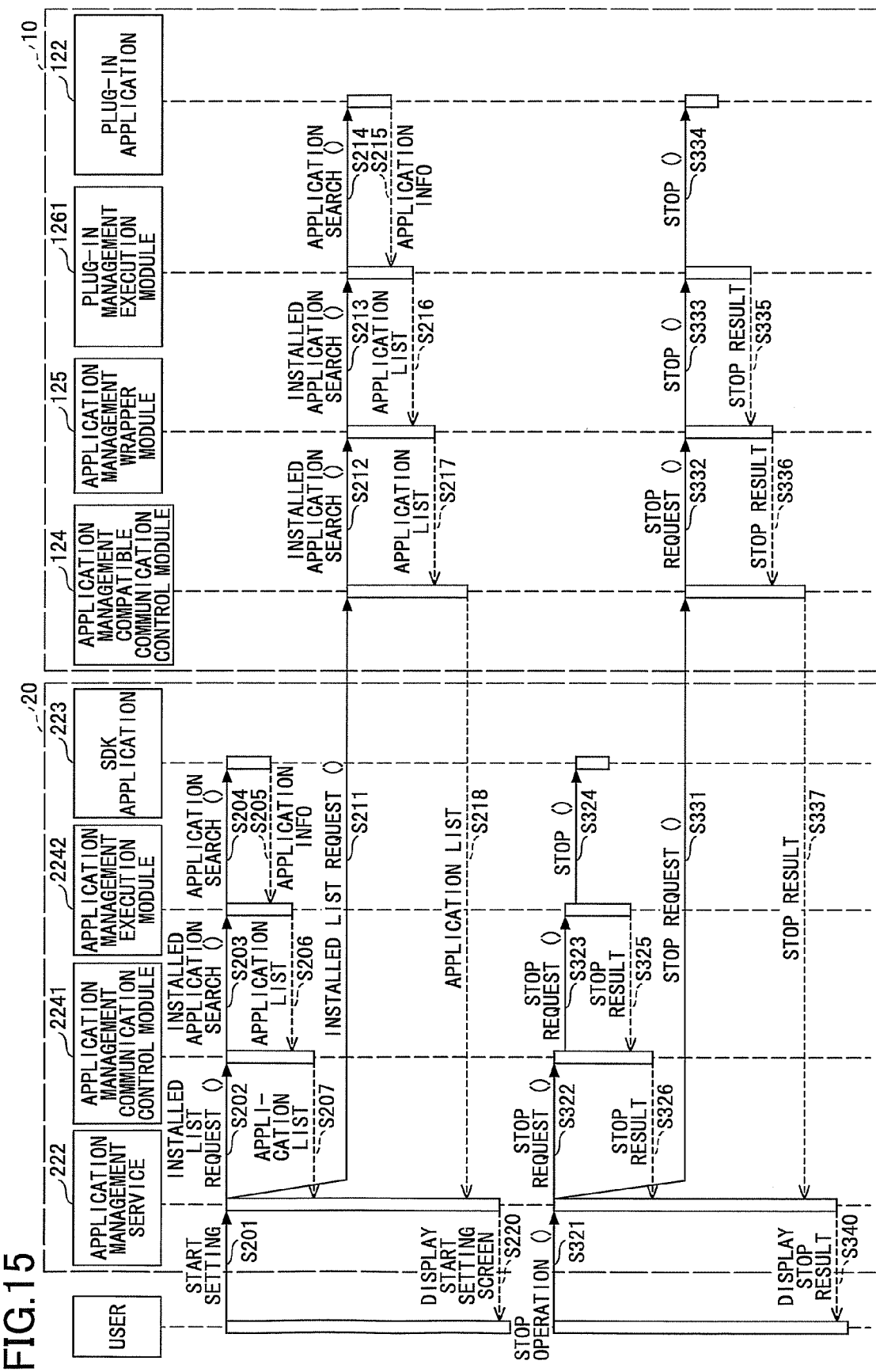
FIG. 15 is a sequence diagram for explaining procedures of an application stop process.

Next, a description will be given of procedures of an application stop process that stops the started application. FIG. 15 is a sequence diagram for explaining the procedures of the application stop process. In FIG. 15, steps S201 through S220 are the same as those corresponding steps illustrated in FIG. 12. In other words, the applications installed in each of the existing image forming apparatus 20 and the new image forming apparatus 10 are searched, and the start setting screen 640 is displayed based on the result of the search.

For example, when one of the applications having the state "started" is selected from the list in the start setting screen 640 illustrated in FIG. 14 and a stop button 642 is pushed in a step S321, a stop process is started. In a case where the application installed in the existing image forming apparatus 20 (for example, the SDK application 223 having the start source "SD card slot 1" in FIG. 13) is included in the selected application, the application management service 222 specifies the product ID of the selected SDK application 223 and sends a stop request for the SDK application 223 with respect to the application management communication control module 2241 by the HTTP communication, in a step S322. The application management communication control module 2241 specifies the product ID of the SDK application 223 and requests stopping of the SDK application 223 with respect to the application management execution module 2242, in response to receiving the stop request, in a step S323. Then, the application management execution module 2242 stops the SDK application 223 (or thread of the SDK application 223) having the specified product ID in the existing image forming apparatus 20, in a step S324. If the stopping of the SDK application 223 in the existing image forming apparatus 20 is successful, the application management execution module 2242 updates the value of the "state" element in the application information of the started SDK application 223 to "stopped".

After the stop process is completed, the application management execution module 2242 outputs the result information of the stop process with respect to the application management communication control module 2241, in a step S325. The application management communication control module 2241 returns the result information to the application management service 222 by the HTTP communication, in a step S326.

In a case where the application selected as the stop target includes the application installed in the new image forming apparatus 10 (for example, the plug-in application 122 having a name "equipment 2" as the start source in FIG. 13), the application management service 222 specifies the product ID of the selected plug-in application 122 and sends a stop request for this plug-in application 122 with respect to the application management compatible communication control module 124 by the HTTP communication, in a step S331. The application management compatible communication control module 124 specifies the product ID of the plug-in application 122 and inputs the stop request for the plug-in application 122 with respect to the application management wrapper module 125, in response to receiving the stop request, in a step S332. The application management wrapper module 125 converts the stop request into a format in accordance with the interface specifications of the plug-in management execution module 1261, and inputs the stop request having the converted format with respect to the plug-in management execution module 1261, in a step S333. Then, the plug-in management execution module 1261 stops the plug-in application 122 (or the thread of the plug-in application 122) having the specified product ID in the new image forming apparatus 10, in a step S334. If the stopping of the plug-in application 122 in the new image forming apparatus 10 is successful, the plug-in management execution module 1261 updates the value of the "state" element in the application information of the stopped plug-in application 122 to a value indicating "stopped".

After the stop process is completed, the plug-in management execution module 1261 outputs the result information of the stop process with respect to the application management wrapper module 125, in a step S335. The application management wrapper module 125 converts the result information into a format in accordance with the interface specifications of the application management execution module 2242, and outputs the result information having the converted format with respect to the application management compatible communication control module 124, in a step S336. The application management compatible communication control module 124 returns the result information to the application management service 222 by the HTTP communication, in a step S337.

Next, the application management service 222 updates the start setting screen 640 based on the result information returned from at least one of the application management communication control module 2241 and the application management compatible communication control module 124, in a step S340. For example, if the plug-in application 122 at the fourth line in the start setting screen 640 is selected as the stop target, the display contents of the start setting screen 640 is updated as illustrated in FIG. 13.

Figure 16:
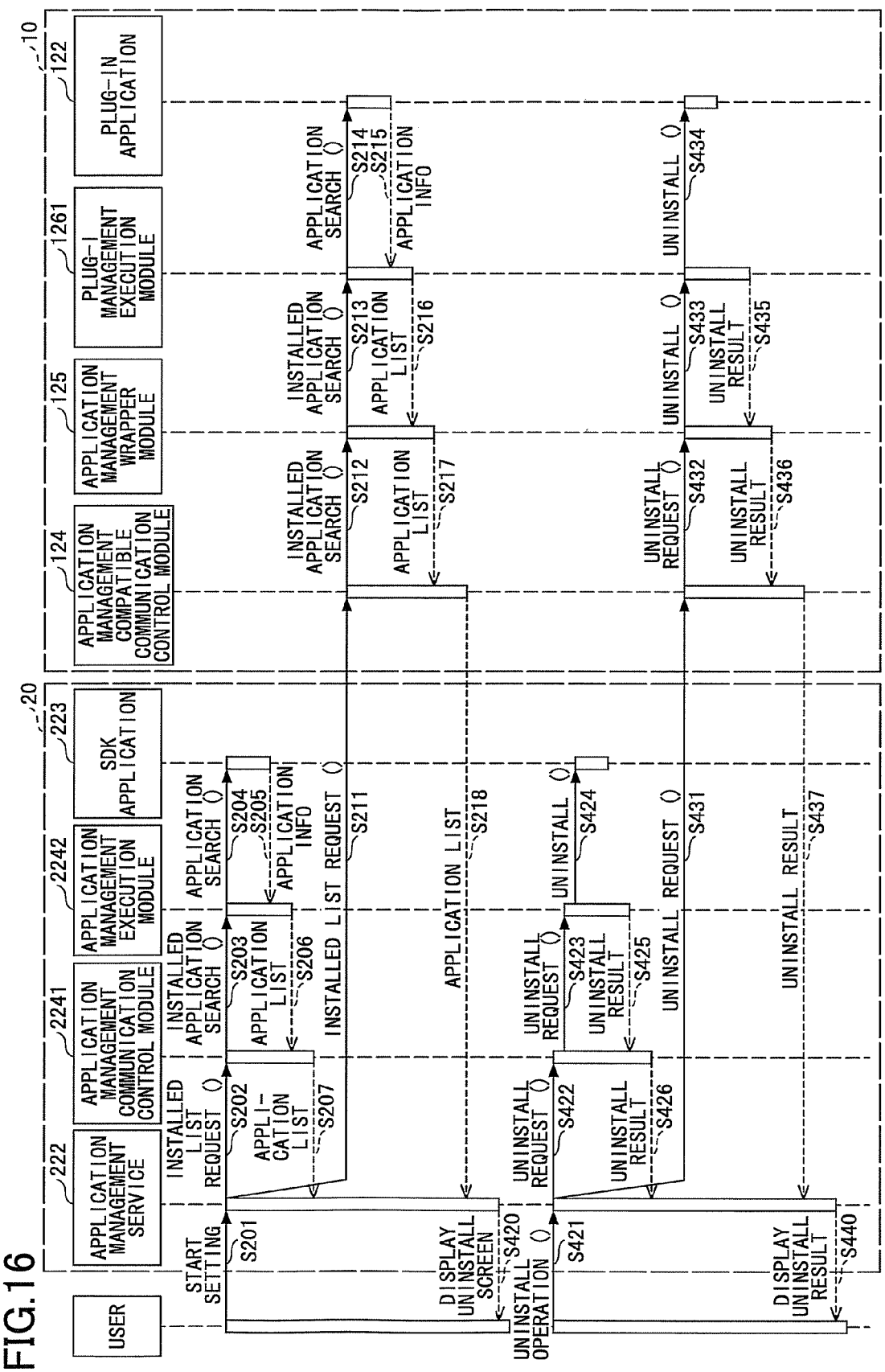
FIG. 16 is a sequence diagram for explaining procedures of an application uninstall process.

A description will now be given of procedures of an uninstall process that uninstalls installed applications that have become unnecessary. FIG. 16 is a sequence diagram for explaining procedures of the application uninstall process.

When the user pushes the uninstall tab 603 in the expanded function initial setting screen 600 displayed on the operation panel of the existing image forming apparatus 20 in a step S401, steps similar to the steps S202 through S218 described above in conjunction with FIG. 12 are carried out. The application management service 222 displays an uninstall screen in the expanded function initial setting screen 600, based on the application lists returned from the application management communication control module 2241 and the application management compatible communication control module 124, in a step S420.

Figure 17:
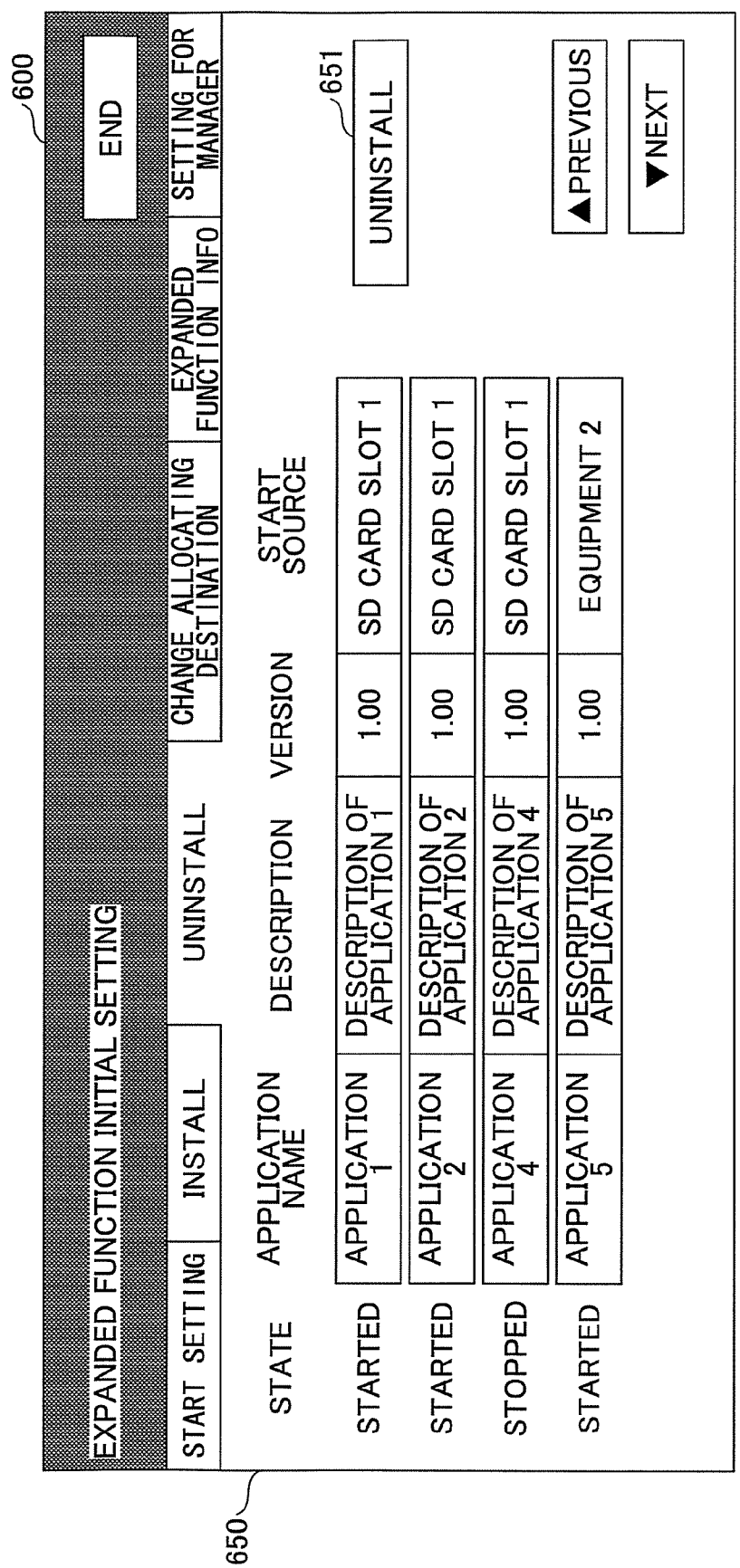
FIG. 17 is a diagram illustrating an example of a display of an uninstall screen.

FIG. 17 is a diagram illustrating an example of a display of the uninstall screen. An uninstall screen 650 illustrated in FIG. 17 has a structure similar to that of the start setting screen 640 described above, and a detailed description of the uninstall screen 650 will be omitted.

When one of the applications is selected from the list in the uninstall screen 650 and an uninstall button 651 is pushed in a step S421, an uninstall process is started. In a case where the application that is installed in the existing image forming apparatus 20 (that is, the SDK application 223 having a "SD card slot 1" as the start source in FIG. 13) is included in the selected application, the application management service 222 specifies the product ID of the selected SDK application 223, and sends an uninstall request for the SDK application 223 to the application management communication control module 2241 by the HTTP communication, in a step S422. The application management communication control module 2241 specifies the product ID of the SDK application 223, and requests the uninstall of the SDK application 223 with respect to the application management execution module 2242, in response to receiving the uninstall request, in a step S423. Then, the application management execution module 2242 uninstalls the SDK application 223 having the specified product ID in the existing image forming apparatus 20, in a step S424.

After the uninstall process is completed, the application management execution module 2242 outputs the result information of the uninstall process with respect to the application management communication control module 2241, in a step S425. The application management communication control module 2241 returns the result information to the application management service 222 by the HTTP communication, in a step S426.

In a case where the application selected as the uninstall target includes the application installed in the new image forming apparatus 10 (for example, the plug-in application 122 having a name "equipment 2" as the start source in FIG. 13), the application management service 222 specifies the product ID of the selected plug-in application 122 and sends an uninstall request for this plug-in application 122 with respect to the application management compatible communication control module 124 by the HTTP communication, in a step S431. The application management compatible communication control module 124 specifies the product ID of the plug-in application 122 and inputs the uninstall request for the plug-in application 122 with respect to the application management wrapper module 125, in response to receiving the uninstall request, in a step S432. The application management wrapper module 125 converts the uninstall request into a format in accordance with the interface specifications of the plug-in management execution module 1261, and inputs the uninstall request having the converted format with respect to the plug-in management execution module 1261, in a step S433. Then, the plug-in management execution module 1261 uninstalls the plug-in application 122 having the specified product ID in the new image forming apparatus 10, in a step S434.

After the uninstall process is completed, the plug-in management execution module 1261 outputs the result information of the uninstall process with respect to the application management wrapper module 125, in a step S435. The application management wrapper module 125 converts the result information into a format in accordance with the interface specifications of the application management execution module 2242, and outputs the result information having the converted format with respect to the application management compatible communication control module 124, in a step S436. The application management compatible communication control module 124 returns the result information to the application management service 222 by the HTTP communication, in a step S437.

Next, the application management service 222 updates the uninstall screen 650 based on the result information returned from at least one of the application management communication control module 2241 and the application management compatible communication control module 124, in a step S440.

As described above, the new image forming apparatus 10 in accordance with this embodiment is provided with the application management compatible communication control module 124 which may accept a request based on the same interface specifications as the application management communication control module 2241 of the existing image forming apparatus 20. For this reason, the application management service 222 of the existing image forming apparatus 20 may input a request related to the management of the plug-in applications 122 in the new image forming apparatus 10, via the application management compatible communication control module 124, using the existing (or conventional) procedures for making a request related to the management of the SDK applications 223 in the existing image forming apparatus 20. As a result, the management of the SDK applications 223 in the existing image forming apparatus 20 and the management of the plug-in applications 122 in the new image forming apparatus 10 may be integrated to provide an integrated operation environment to the user. Therefore, the user may operate a single image forming apparatus and simultaneously and centrally manage the applications related to a plurality of image forming apparatuses.

The apparatus that provides the user interface (or operation environment) for making the simultaneous and central management of the applications may not be one of the plurality of image forming apparatuses whose application management mechanisms are integrated. For example, an information processing apparatus, such as a PC (Personal Computer), that is connected to the plurality of image forming apparatuses via a network may be used to simultaneously and centrally manage the applications related to the plurality of image forming apparatuses.

Figure 18:
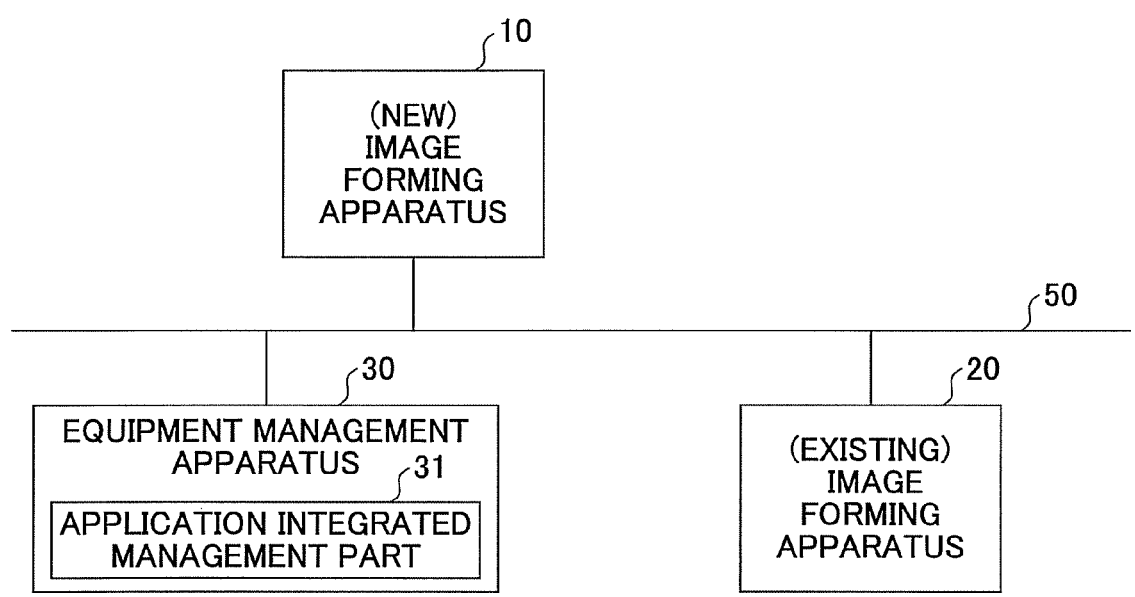
FIG. 18 is a block diagram illustrating an example of the system structure for a case where an integrated operation environment is provided by a general-purpose computer.

FIG. 18 is a block diagram illustrating an example of the system structure for a case where an integrated operation environment is provided by a general-purpose computer. In FIG. 18, those parts that are the same as those corresponding parts in FIG. 1 are designated by the same reference numerals, and a description thereof will be omitted.

In FIG. 18, an equipment management apparatus 30 is connected to the network 50, in addition to the image forming apparatuses 10 and 20. The equipment management apparatus 30 may be formed by a general-purpose computer, such as a PC, for example. The equipment management apparatus 30 includes an application integrated management part 31 that may be formed by software. A program installed in the equipment management apparatus 30 may cause the CPU of the equipment management apparatus 30 to execute processes of the application integrated management part 31.

The application integrated management part 31 carries out procedures similar to those carried out by the application management service 222 of the existing image forming apparatus 20. In other words, the application management service 222 in each of FIGS. 6, 12, 15, and 16 may be replaced by the application integrated management part 31. In this case, the application integrated management part 31 displays the screens illustrated in FIGS. 7, 9, 11, 13, 14, and 17 on a display unit of the equipment management apparatus 30.

According to the system structure illustrated in FIG. 18, it is possible to integrate the management of the applications in a plurality of image forming apparatus using the general-purpose computer such as the PC.

Further, the present invention is not limited to these embodiments, but various variations and modifications may be made without departing from the scope of the present invention.

What is claimed is:

1. An image forming apparatus to be coupled via a network to an other image forming apparatus that includes a first interface providing a first execution environment for first programs and manages the first programs using the first interface in response to a first request that conforms to first interface specifications using a predetermined communication protocol, the image forming apparatus comprising:
- a processing unit configured to execute a process including
  - managing second programs using a second interface having a structure different from that of the first interface and providing a second execution environment for the second programs, in response to a second request that conforms to second interface specifications different from the first interface specifications and is other than the first request;
  - wherein the first execution environment within the other image forming apparatus and the second execution environment within the image forming apparatus are different and are incompatible with each other, and
  - wherein the first programs are executed via the first interface in the first execution environment, and the second programs are executed via the second interface in the second execution environment,
  - accepting the first request that conforms to the first interface specifications;
  - first converting the first request that conforms to the first interface specifications and is accepted by the accepting into a converted request that conforms to the second interface specifications and is compatible with the second execution environment, and inputting the converted request to the managing, by communicating between the image forming apparatus and the other image forming apparatus according to a communication protocol that is neutral with respect to programming languages used in the first and second execution environments in order to acquire information of the second programs, including the second interface specifications; and
  - returning result information of a process in accordance with the converted request, output by the managing, to an input source of the first request accepted by the accepting,
  - wherein the returning includes second converting the result information into a format that conforms to the first interface specifications using the predetermined communication protocol before returning the result information to the input source, and
  - wherein the managing includes controlling execution of at least one of installing the second programs, starting the second programs, stopping the second programs, uninstalling the second programs, and confirming list information of a list of second programs installed in the image forming apparatus.

2. The image forming apparatus as claimed in claim 1, wherein the managing installs at least one of the second programs in response to the second request that requests to install the at least one of the second programs and conforms to the second interface specifications.

3. The image forming apparatus as claimed in claim 2, wherein the managing acquires, from a storage unit, the list information of the list of the second programs installed in the image forming apparatus, in response to an acquisition request for the list information, that conforms to the second interface specifications.

4. The image forming apparatus as claimed in claim 2, wherein the managing uninstalls at least one of the second programs in response to the second request that requests to uninstall the at least one of the second programs and conforms to the second interface specifications.

5. The image forming apparatus as claimed in claim 1, wherein the second converting includes
- receiving the result information of the process in accordance with the converted request, output by the managing with a format that conforms to the second interface specifications;
- converting the format of the result information into the format that conforms to the first interface specifications; and
- returning the result information with the format that conforms to the first interface specifications to the input source.

6. A program management system comprising:
- a first image forming apparatus, comprising a first processing unit that includes a first interface, and configured to manage first programs using the first interface in response to a first request that conforms to first interface specifications using a predetermined communication protocol; and
- a second image forming apparatus coupled to the first image forming apparatus via a network, and comprising a second processing unit configured to execute a process including
  - managing second programs using a second interface that has a structure different from that of the first interface, in response to a second request that conforms to second interface specifications different from the first interface specifications and is other than the first request;
  - wherein the first programs are executed via the first interface in a first execution environment within the first image forming apparatus, and the second programs are executed via the second interface in a second execution environment within the second image forming apparatus, and
  - wherein the first execution environment and the second execution environment are different and are incompatible with each other,
  - accepting the first request that conforms to the first interface specifications;
  - first converting the first request that conforms to the first interface specifications and is accepted by the accepting into a converted request that conforms to the second interface specifications and is compatible with the second execution environment, and inputting the converted request to the managing, by communicating between the first image forming apparatus and the second image forming apparatus according to a communication protocol that is neutral with respect to programming languages used in the first and second execution environments in order to acquire information of the second programs, including the second interface specifications;
  - returning result information of a process in accordance with the converted request, output by the managing, to an input source of the first request accepted by the accepting,
  - wherein the returning includes second converting the result information into a format that conforms to the first interface specifications using the predetermined communication protocol before returning the result information to the input source, and
  - wherein the managing includes controlling execution of at least one of installing the second programs, starting the second programs, stopping the second programs, uninstalling the second programs, and confirming list information of a list of second programs installed in the second image forming apparatus.

7. The program management system as claimed in claim 6, wherein the managing by the second image forming apparatus installs at least one of the second programs in response to the second request that requests to install the at least one of the second programs and conforms to the second interface specifications.

8. The program management system as claimed in claim 7, wherein the managing by the second image forming apparatus acquires, from a storage unit, the list information of the list of the second programs installed in the image forming apparatus, in response to an acquisition request for the list information, that conforms to the second interface specifications.

9. The program management system as claimed in claim 7, wherein the managing by the second image forming apparatus uninstalls at least one of the second programs in response to the second request that requests to uninstall the at least one of the second programs and conforms to the second interface specifications.

10. The program management system as claimed in claim 6, wherein the second converting includes
receiving the result information of the process in accordance with the converted request, output by the managing with a format that conforms to the second interface specifications;
converting the format of the result information into the format that conforms to the first interface specifications; and
returning the result information with the format that conforms to the first interface specifications to the input source.

11. A non-transitory computer-readable storage medium which stores a program which, when executed by a computer, causes the computer to carry out a process of an image forming apparatus coupled via a network to an other image forming apparatus that includes a first interface and manages first programs using the first interface in response to a first request that conforms to first interface specifications using a predetermined communication protocol, said process comprising:
managing second programs using a second interface that has a structure different from that of the first interface, in response to a second request that conforms to second interface specifications different from the first interface specifications and is other than the first request;
wherein the first programs are executed via the first interface in a first execution environment within the other image forming apparatus, and the second programs are executed via the second interface in a second execution environment within the image forming apparatus, and
wherein the first execution environment and the second execution environment are different and are incompatible with each other,
accepting the first request that conforms to the first interface specifications;
first converting the first request that conforms to the first interface specifications and is accepted by the accepting into a converted request that conforms to the second interface specifications and is compatible with the second execution environment, and inputting the converted request to the managing, by communicating between the image forming apparatus and the other image forming apparatus according to a communication protocol that is neutral with respect to programming languages used in the first and second execution environments in order to acquire information of the second programs, including the second interface specifications; and
returning result information of a process in accordance with the converted request, output by the managing, to an input source of the first request accepted by the accepting,
wherein the returning includes second converting the result information into a format that conforms to the first interface specifications using the predetermined communication protocol before returning the result information to the input source, and
wherein the managing includes controlling execution of at least one of installing the second programs, starting the second programs, stopping the second programs, uninstalling the second programs, and confirming list information of a list of second programs installed in the image forming apparatus.

12. The non-transitory computer-readable storage medium as claimed in claim 11, wherein the managing installs at least one of the second programs in response to the second request that requests to install the at least one of the second programs and conforms to the second interface specifications.

13. The non-transitory computer-readable storage medium as claimed in claim 12, wherein the managing acquires, from a storage unit, the list information of the list of the second programs installed in the image forming apparatus, in response to an acquisition request for the list information, that conforms to the second interface specifications.

14. The non-transitory computer-readable storage medium as claimed in claim 12, wherein the managing uninstalls at least one of the second programs in response to the second request that requests to uninstall the at least one of the second programs and conforms to the second interface specifications.

15. The non-transitory computer-readable storage medium as claimed in claim 11, wherein the second converting includes
receiving the result information of the process in accordance with the converted request, output by the managing with a format that conforms to the second interface specifications;
converting the format of the result information into the format that conforms to the first interface specifications; and
returning the result information with the format that conforms to the first interface specifications to the input source.

* * * * *